(12) United States Patent
Hasegawa et al.

(10) Patent No.: US 7,110,148 B2
(45) Date of Patent: Sep. 19, 2006

(54) DUPLEX IMAGE READING APPARATUS

(75) Inventors: Kazuhiko Hasegawa, Chiba (JP); Hirohisa Sawada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 10/023,666

(22) Filed: Dec. 21, 2001

(65) Prior Publication Data

US 2002/0105686 A1     Aug. 8, 2002

(30) Foreign Application Priority Data

Dec. 28, 2000   (JP)   .............................. 2000/400971
Apr. 20, 2001   (JP)   .............................. 2001/122215
Jun. 29, 2001   (JP)   .............................. 2001/199560
Dec. 3, 2001    (JP)   .............................. 2001/369214

(51) Int. Cl.
    *H04N 1/04*      (2006.01)
(52) U.S. Cl. ..................... 358/474; 358/199; 358/408; 358/500; 358/540; 250/234; 359/197; 399/31; 355/24
(58) Field of Classification Search ................ 358/496, 358/498, 474, 300, 444, 500, 494, 540, 449, 358/488, 407, 296, 4, 199, 408; 399/31; 355/24; 250/234; 359/197
    See application file for complete search history.

(56) References Cited

U.S. PATENT DOCUMENTS 5,386,299 A    1/1995   Wilson et al. .............. 358/406
5,453,852 A    9/1995   Morikawa et al. .......... 358/498

(Continued)

FOREIGN PATENT DOCUMENTS

FR         2761222          9/1998

(Continued)

OTHER PUBLICATIONS

European Search Report in Application No. 01130938.2 (Jul. 2, 2004).

(Continued)

*Primary Examiner*—Edward Coles
*Assistant Examiner*—Heather D Gibbs
(74) *Attorney, Agent, or Firm*—Fitzpatrick, Cella, Harper & Scinto

(57) ABSTRACT

A duplex image reading apparatus has a transportation path for transporting a sheet original to a reading region by an original transporting device, and first and second reading devices placed corresponding to respective transportation sides of the sheet original in the reading region of the transportation path, and is constructed in such structure that each of the first and second reading devices is of such a configuration that a color reference portion used as a color reference for reading is opposed to a reading portion while the color reference portion and the reading portion are placed on two sides with the transportation sides of the sheet original in between, wherein the first and second reading devices are arranged so that either one of the reading portion and the color reference portion is supported so as to be movable in a direction substantially perpendicular to an image reading surface of the reading portion.

4 Claims, 14 Drawing Sheets

U.S. PATENT DOCUMENTS

| | | | |
|---|---|---|---|
| 5,751,438 A | 5/1998 | Murai et al. | 358/403 |
| 5,764,382 A | 6/1998 | Shiraishi | 358/496 |
| 5,915,691 A | 6/1999 | Deguchi et al. | 271/265.01 |
| 5,956,161 A * | 9/1999 | Takashimizu et al. | 358/496 |
| 5,986,775 A | 11/1999 | Yoshimizu | 358/496 |
| 6,147,778 A | 11/2000 | Yamada et al. | 358/474 |

FOREIGN PATENT DOCUMENTS

| | | |
|---|---|---|
| JP | 11-289428 | 4/1998 |
| JP | 10-190938 | 7/1998 |
| JP | 12-115452 | 4/2000 |
| KR | 2001-85651 | 7/2002 |

OTHER PUBLICATIONS

Office Action (in English) from counterpart application 01144075.9 from Patent Office in China, dated Jun. 18, 2004.

European Search Report in Application No. 01130938.2-1522/ (May 4, 2004).

* cited by examiner ent invention relates to duplex image reading
DUPLEX IMAGE READING APPARATUS

BACKGROUND OF THE INVENTION

1. Field of the Invention

The present invention relates to duplex image reading apparatus for reading images on two sides of an original transported by original transporting means.

2. Description of Related Art

Among conventional duplex image reading apparatus is one proposed in such structure that two image reading devices are arranged in a fixed state on respective sides of a bent transportation path, as described in Japanese Patent Application Laid-Open No. 2000-115452.

There is another apparatus proposed in such structure that two image reading devices are arranged at positions almost opposite to each other, one image reading device is fixed, and the other image reading device is urged against the fixed image reading device, as described in Japanese Patent Application Laid-Open No. 10-190938.

In the former conventional example (Japanese Patent Application Laid-Open No. 2000-115452) described above, however, the positional relation between the two image reading devices was greatly associated with the transportation performance of an original and there was the drawback that, particularly, when two image reading surfaces were not parallel but inclined, the original was not smoothly transported, so as to cause an original jam. In order to avoid it, it was necessary to apply severe dimensional accuracy to components and provide means of provision of an adjusting mechanism, which was the cause of cost increase.

In the foregoing latter conventional example (Japanese Patent Application Laid-Open No. 10-190938), since the apparatus was applied to the image reading apparatus, such as facsimile machines and image scanners, the structure did not allow use of general-purpose image reading devices typified by contact image sensors. For this reason, it was necessary to fabricate dedicated image reading devices, but it must raise the cost considerably.

SUMMARY OF THE INVENTION

An object of the invention according to the present application is to provide inexpensive duplex image reading apparatus with stable transportation performance and duplex reading performance with high image quality, using inexpensive reading means.

A reading apparatus according to the present invention comprises a transportation path for transporting a sheet original to a reading region by original transporting means; and first and second reading means located corresponding to respective transportation sides of the sheet original in the reading region of the transportation path, and is constructed in such structure that each of the first and second reading means is of such a configuration that a color reference portion used as a color reference for reading is opposed to a reading portion while the color reference portion and the reading portion are placed on two sides with the transportation sides of the sheet original in between, wherein the first and second reading means are arranged so that either one of the reading portion and the color reference portion is supported so as to be movable in a direction substantially perpendicular to an image reading surface of the reading portion.

In the foregoing reading apparatus, the first reading means fixedly supports the reading portion relative to the main body of the apparatus; the second reading means supports the reading portion so as to be movable in the direction substantially perpendicular to the image reading surface; the color reference portion of the first reading means is arranged to be movable in the direction substantially perpendicular to the image reading surface so that the sheet original is urged toward the image reading surface of the first reading means; and the color reference portion of the second reading means is fixed on a substantially same plane as the image reading surface of the first reading means and the image reading surface of the second reading means is urged so as to contact the color reference portion of the second reading means.

An image reading apparatus of the present invention comprises image reading means for reading an image formed on a sheet; pressing means for regulating a rise of the sheet over a predetermined height from an image reading position of the image reading means; and charge eliminating means for eliminating static electricity accumulated on the sheet.

An image reading apparatus of the present invention comprises first image reading means for reading an image on one side of a sheet with images formed on two sides thereof; second image reading means for reading an image on the other side of the sheet with the images formed on the two sides thereof; first pressing means for regulating a rise of the sheet over a predetermined height from an image reading position of the first image reading means; second pressing means for regulating a rise of the sheet over a predetermined height from an image reading position of the second image reading means; first charge eliminating means for eliminating static electricity accumulated on the sheet, from one side of the sheet; and second charge eliminating means for eliminating static electricity accumulated on the sheet, from the other side of the sheet.

For accomplishing the above object, an image forming apparatus of the present invention comprises either one of the foregoing image reading apparatus; and image forming means for forming an image on a recording medium, based on image read information read by the image reading apparatus.

With the charge eliminating means, static electricity accumulated on the original becomes easier to flow away even if a plastic nonconductive member (an insulating member) such as a polyester sheet easy to be charged, are used as a white-ground pressure plate for the purpose of cost reduction.

Further, the charge can also be eliminated readily even in such a wingless layout that an original stacking tray and an original delivery tray are located in the upper part of the apparatus and in such structure that the original is transported while being rubbed in a U-turn transportation path, from the viewpoint of space saving of the duplex image reading apparatus.

Particularly, when the original is transported at a high speed in fast reading of the original, it becomes easier for the original to be charged. As the charged original enters the reading portion, the charge eliminating means works to reduce possibilities of causing transportation failure, causing a malfunction of the image reading portion, and causing breakage due to the static electricity, as described above.

In one-side image reading apparatus similar effect is also achieved even if the original is charged, upon entry of the original into the image reading portion.

As described above, the invention according to the present application makes it feasible to provide the inexpensive duplex image reading apparatus capable of stably transporting the original and capable of performing high-quality two-side reading without reading failure such as defocus or the like, using general-purpose inexpensive reading means typified by contact image sensors.

The invention according to the present application permits the image reading surface of the first reading means and the image reading surface of the second reading means to be arranged on the substantially same plane with high accuracy, without needs for any complicated mechanism or adjustment, and thus is able to implement cost reduction.

The invention according to the present application takes up any play or slop in attachment of the second reading means and prevents deviation of the second reading means during transportation of the original, thereby enabling reading in high resolution.

The invention according to the present application eliminates the moment caused by the frictional force acting on the second reading means and prevents deviation of the second reading means during transportation of the original, thereby enabling reading in high resolution.

The invention according to the present application permits the static electricity accumulated on the second reading means to be guided to the ground in the main body of the apparatus, without needs for any other additional component, and thus is able to implement cost reduction.

Since the apparatus is constructed in such structure that the first reading means is fixedly supported while the second reading means is rotatably supported and comprises first abutting means and second abutting means provided at the first reading means and at the second reading means, respectively, and arranged in contact with each other outside an original transportation region; reading urging means for urging the second reading means in a direction in which the second abutting means abuts against the first abutting means; a first white reference disposed at a position opposite to the first reading means so that the original is urged toward an image reading surface of the first reading means, the first white reference having white color as a color reference of the first reading means; and a second white reference disposed at a position opposite to the second reading means so that the original is urged toward an image reading surface of the second reading means, the second white reference having white color as a color reference of the second reading means, the apparatus is able to readily regulate the positional relation between the reading means even in use of the inexpensive reading means and effect stable transportation performance and duplex reading performance with high quality.

The image reading apparatus of the present invention is able to reduce the static electricity on the original so as to stabilize the original transportation performance and prevent malfunctions and breakage of the image reading means.

DESCRIPTION OF THE PREFERRED EMBODIMENTS (First Embodiment)

The first embodiment of the present invention will be described below on the basis of FIGS. 1 to 3.

Figure 1:
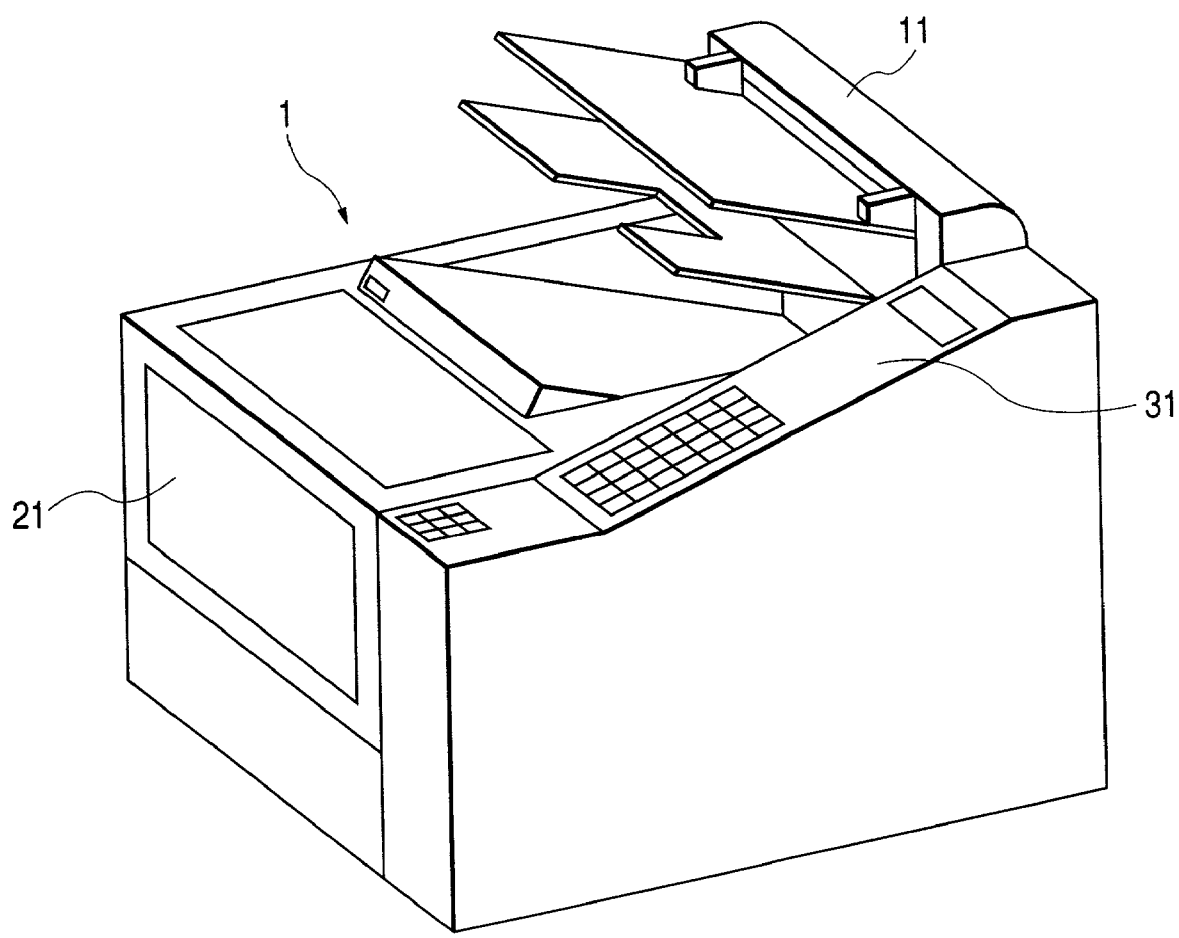
FIG. 1 is a perspective view of a facsimile machine showing the first embodiment of the present invention.

FIG. 1 is a perspective view of a facsimile machine showing the first embodiment of the present invention.

In FIG. 1, the facsimile machine 1 is comprised of a reading section 11 for reading an original S, a recording section 21 for recording an image read by the reading section 11, or a received image on a recording sheet, an operation section 31 for permitting the user to operate the machine, and a control section, not shown, for controlling sending/receiving, and copy operations. The duplex image reading apparatus of the present invention is applied to the reading section 11.

Figure 2:
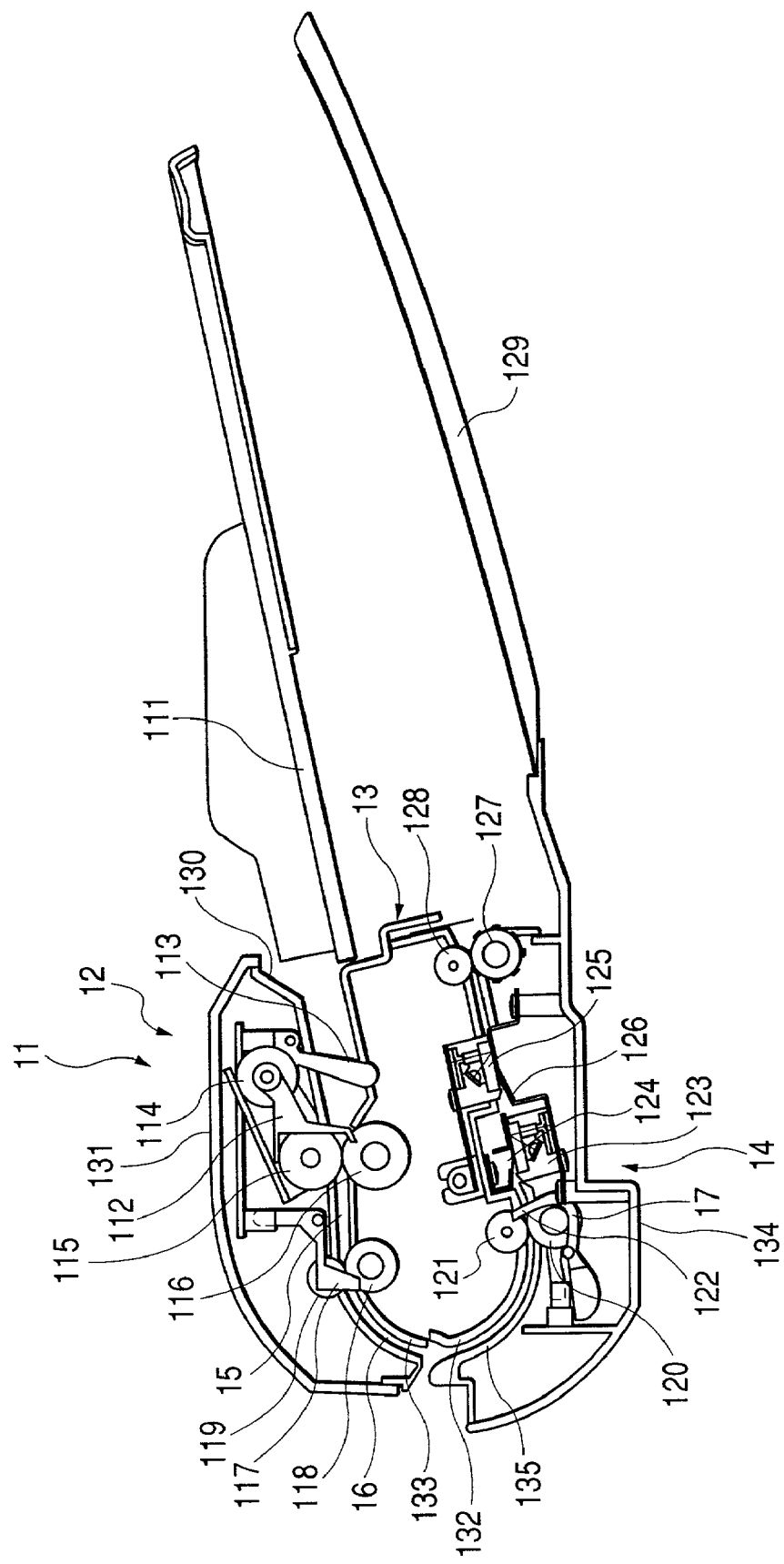
FIG. 2 is a cross-sectional view of a reading section of FIG. 1.

FIG. 2 is a cross-sectional view of the reading section 11 to which the duplex image reading apparatus is applied, and the structure and operation of the reading section 11 will be described below with reference to FIG. 2.

The operator sets originals S on an original stand 111. At this time, the leading edges of the originals S are regulated by an original stopper 112. When the originals S are set, an original presence/absence sensor 113 detects them.

When the operator inputs a command of start of reading at the operation section 31, a front side reading portion 123 (first reading means) reads a front side white reference 124 (movable white reference) arranged opposite thereto and sets a read value as a white reference value of the front side, and a back side reading portion 125 (second reading means) reads a back side white reference 126 (stationary white reference) arranged opposite thereto and sets a read value as a white reference value of the back side. The front side white reference is white color used as a color reference of the reading means and is a white sheet member in the present embodiment.

A driving portion not shown rotates to release the original stopper 112 whereupon a pickup roller 114 feeds an original S into the interior of the apparatus.

The originals S are separated one by one by a separation roller 115 and a reverse rotating roller 116 and the uppermost original S is transported along an upper transportation path 15. When an original feed sensor 117 detects the leading edge of the original S, the feeding by the pickup roller 114 is terminated. The original S thus separated is transported into a U-shaped transportation path 16 by a draw roller 118 and a draw runner 119 urged against the draw roller 118.

The original S is transported along a lower transportation path 17 by a transportation roller 120 and a transportation runner 121 urged against the transportation roller 120.

When an original edge sensor 122 detects the leading edge of the original S, the front side reading portion 123 starts reading image information on the front side when the original S is transported by a predetermined distance from the detection position of the leading edge thereof. Thereafter, when the original S is transported by a predetermined distance, the back side reading portion 125 starts reading image information on the back side. When the original edge sensor 122 detects the trailing edge of the original S, the front side reading portion 123 stops reading the front side image information when the original S is transported by a predetermined distance therefrom, and thereafter the original S is transported by a predetermined distance, the back side reading portion 125 stops reading the back side image information.

A delivery roller 127 and a delivery runner 128 urged against the delivery roller 127 deliver the original S onto an original delivery tray 129.

After the trailing edge of the original S under the reading operation passes the separation roller 115, the next original S is normally continuously transported. There are, however, cases where the next original is not continuously transported, because of friction between originals and the like. In such cases, unless the original feed sensor 117 detects the leading edge of the next original S even after a lapse of a predetermined time in spite of detection of the trailing edge of the preceding original S from the original feed sensor 117 and detection of presence of original from the original presence/absence sensor 113, the pickup roller 114 restarts feeding an original S so as to transport the next original S.

In this way, the reading operation as described is repeated until the original presence/absence sensor 113 detects absence of the original.

A unit configuration of the reading section 11 will be described below.

In FIG. 2, the reading section 11 is comprised of an upper transportation guide unit 12, a middle transportation guide unit 13, and a lower transportation guide unit 14.

The upper transportation guide unit 12 is constructed in structure in which the original stopper 112, the original presence/absence sensor 113, the pickup roller 114, the separation roller 115, the original feed sensor 117, and the draw runner 119 are mounted on an upper transportation frame 130 constituting the upper transportation path 15 and a part of the U-shaped transportation path 16, and are covered by an upper transportation cover 131.

The middle transportation guide unit 13 is constructed in structure in which the reverse rotating roller 116, the draw roller 118, the transportation runner 121, the front side white reference 124, the back side reading portion 125, and the delivery runner 128 are mounted on a middle transportation frame 132 constituting a part of the U-shaped transportation path 16 and the lower transportation path 17, and are covered by a middle transportation cover 133 constituting the upper transportation path 15 and a part of the U-shaped transportation path 16.

The lower transportation guide unit 14 is constructed in structure in which the transportation roller 120, the original edge sensor 122, the front side reading portion 123, the back side white reference 126, and the delivery roller 127 are mounted on a lower transportation frame 134 and covered by a lower transportation cover 135 constituting a part of the U-shaped transportation path 16 and the lower transportation path 17.

The lower transportation guide unit 14 is mounted so as to be fixed relative to the facsimile machine 1, and the upper transportation guide unit 12 and the middle transportation guide unit 13 are supported so as to be rotatable relative to the lower transportation guide unit 14.

In the next place, the detailed structure of the front side reading portion 123, the front side white reference 124, the back side reading portion 125, and the back side white reference 126, which are the features of the present embodiment, will be described referring to the partially enlarged view of the reading section shown in FIG. 3.

Figure 3:
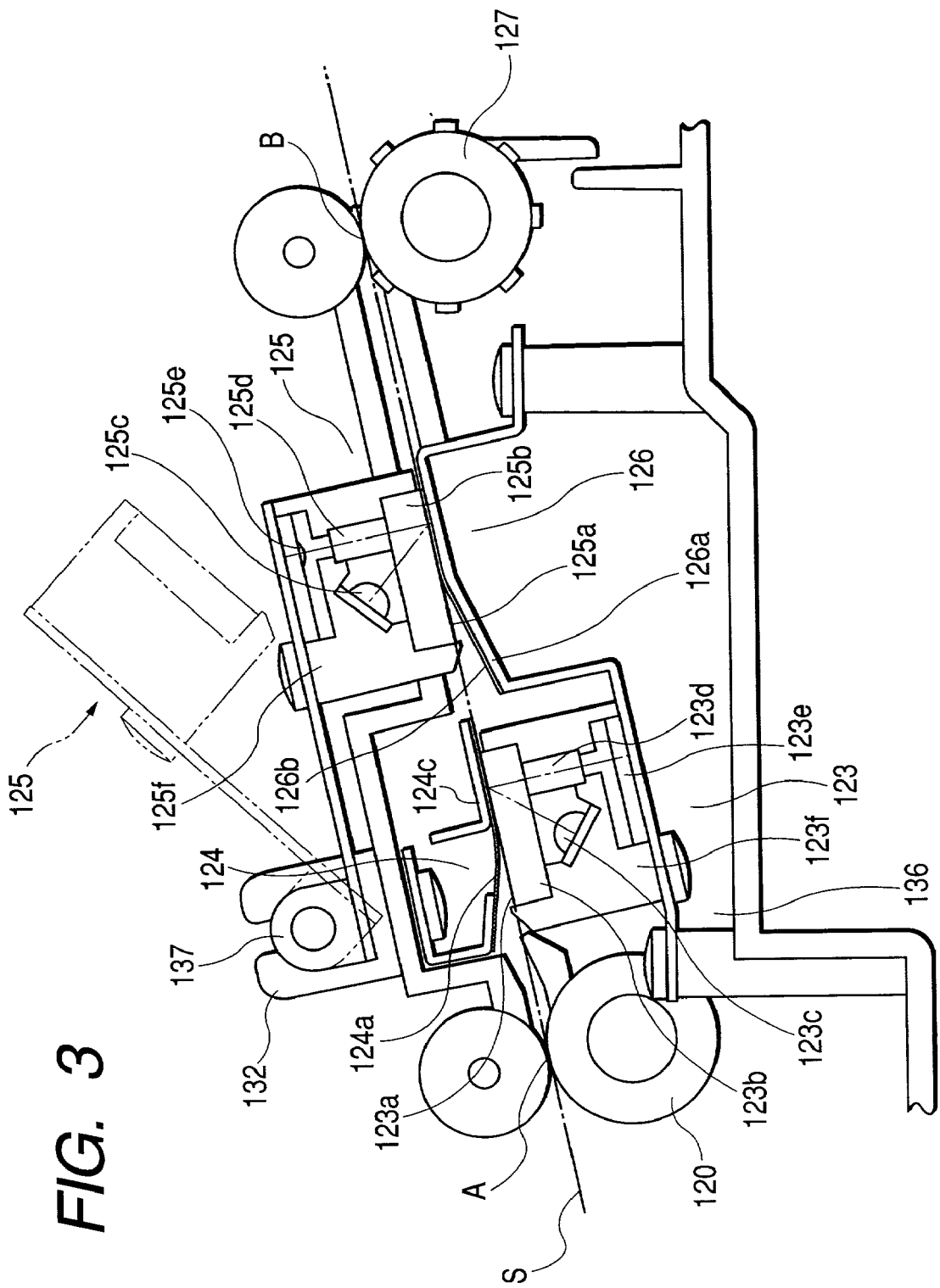
FIG. 3 is a partially enlarged view of the reading section of FIG. 1.

In FIG. 3, the front side reading portion 123 is a general-purpose reading device typified by the contact image sensors, and is constructed to illuminate the original S placed in close contact on a contact glass plate 123b defining an image reading surface 123a, with light from a light source 123c, image the light reflected back from the original S on a photoelectric conversion element 123e through a short-focus imaging lens 123d, and convert an optical signal bearing the image information of the original S, into an electric signal with the photoelectric conversion element 123e, thus effecting reading of the image information.

The contact glass plate 123b, the light source 123c, the short-focus imaging lens 123d, and the photoelectric conversion element 123e are integrally housed in a sensor housing 123f, and the sensor housing 123f is fixedly supported by a front side reading portion holder 136 so that the image reading surface 123a is substantially coplanar with a plane connecting an original nip point A of the transportation roller 120 to an original nip point B of the delivery roller 127.

The front side white reference 124 is comprised of a stationary mount plate 124a, a white, flexible sheet material 124b the upstream side of which is stuck to the mount plate 124a, and a metal plate 124c stuck to a downstream free end of the flexible sheet material 124b, and is arranged so as to urge the original S against the image reading surface 123a of the front side reading portion 123 with the own weight of the metal plate 124c.

The back side reading portion 125 is also a general-purpose reading device typified by the contact image sensors, as the front side reading portion 123 was, and is constructed to illuminate the original S placed in close contact on a contact glass plate 125b defining an image reading surface 125a, with light from a light source 125c, image the light reflected back from the original S on a photoelectric conversion element 125e through a short-focus imaging lens 125d, and convert an optical signal bearing the image information of the original S, into an electric signal with the photoelectric conversion element 125e, thus effecting reading of the image information.

The contact glass plate 125b, the light source 125c, the short-focus imaging lens 125d, and the photoelectric conversion element 125e are integrally housed in a sensor housing 125f, and the sensor housing 125f is mounted on a back side reading portion holder 137 supported so as to be rotatable relative to the middle transportation frame 132 and is constructed so that the image reading surface 125*a* is urged against the back side white reference 126 with the own weight of the sensor housing 125*f*.

Here the movable range of the back side reading portion 125 can be a small range to the extent of S+α where S is the thickness of the original, and it can be mentioned that in that range the back side reading portion 125 is displaced in a direction substantially perpendicular to the image reading surface 125*a*.

Figure 4:
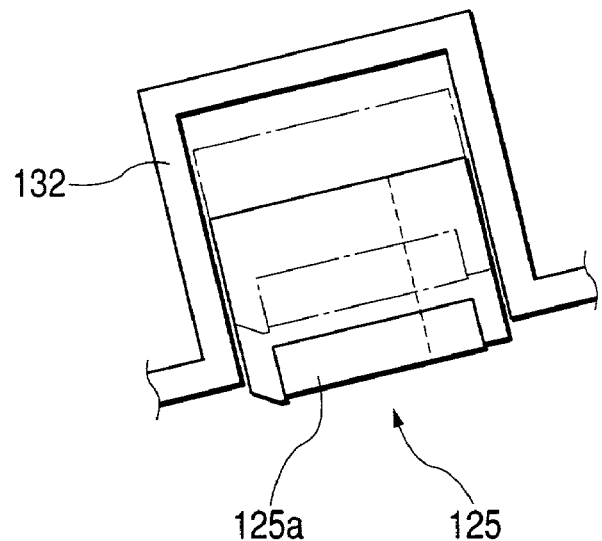
FIG. 4 is a partial view of the reading section showing a modification example of the first embodiment.

It is also possible to employ such a configuration that the back side reading portion 125 slides relative to the middle transportation frame 132 in the direction perpendicular to the image reading surface 125*a* and is thus displaced in a direction perfectly perpendicular to the image reading surface 125*a*, as shown in FIG. 4.

The back side white reference 126 is constructed in such structure that a white, flexible sheet material 126*b* is stuck to a back side white reference sticking portion 126*a* constructed integrally with the front side reading portion holder 136 and that the surface in contact with the image reading surface 125*a* of the back side reading portion 125 is substantially coplanar with the image reading surface 123*a* of the front side reading portion 123, i.e., substantially coplanar with the plane connecting the original nip point A of the transportation roller 120 to the original nip point B of the delivery roller 127.

As constructed in this structure, the front side reading portion 123 and the back side white reference 126 can be positioned with high accuracy, and this means in turn that the image reading surface 123*a* of the front side reading portion 123 and the image reading surface 125*a* of the back side reading portion 125 can be arranged on the almost same plane with high accuracy, without necessity for any complicated mechanism or adjustment at all.

By the structure as described above, the original S can be transported without occurrence of transportation failure such as a jam or the like and the image reading surface 123*a* of the front side reading portion 123 and the image reading surface 125*a* of the back side reading portion 125 both can be securely kept in close contact with the original S, whereby the images can be read without occurrence of reading failure such as defocus or the like.

In the present embodiment the back side reading portion 125 is urged against the back side white reference 126 with the own weight of the back side reading portion 125, but it is needless to mention that similar effect can also be achieved by adjusting the urging force by a spring or the like, depending upon the weight of the back side reading portion 125.

(Second Embodiment)

Figure 5:
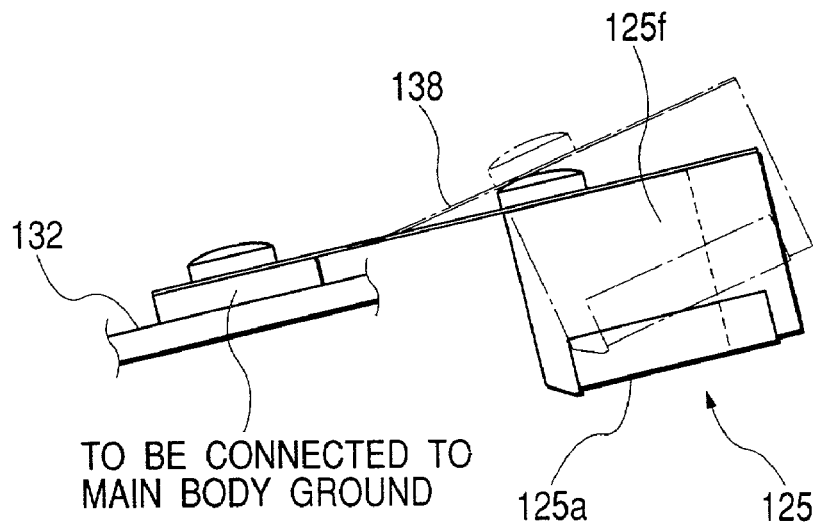
FIG. 5 is a partially enlarged view of the reading section showing the second embodiment of the present invention.

FIG. 5 is a partially enlarged view of the back side reading portion 125 showing the second embodiment of the present invention.

In FIG. 5, the sensor housing 125*f* of the back side reading portion 125 is arranged so that the sensor housing 125*f* is elastically supported so as to be displaceable in the direction substantially perpendicular to the image reading surface 125*a*, by an electroconductive leaf spring 138 connected to the ground (not shown) in the main body of the apparatus so that the image reading surface 125*a* is urged against the back side white reference 126.

As this structure has no play or slop in between the fitting portions, as compared with the supporting methods as shown in FIGS. 3 and 4, the back side reading portion 125 is prevented from deviating in the transporting direction, and it is thus feasible to implement reading in high resolution.

Further, static electricity is generated by the friction between the image reading surface 125*a* and the original S. However, because the back side reading portion 125 is supported by the electroconductive leaf spring 138 connected to the ground in the main body of the apparatus, the static electricity accumulated in the back side reading portion 125 can be discharged to the ground in the main body of the apparatus without necessity for any other additional component, which can decrease the cost.

(Third Embodiment)

Figure 7:
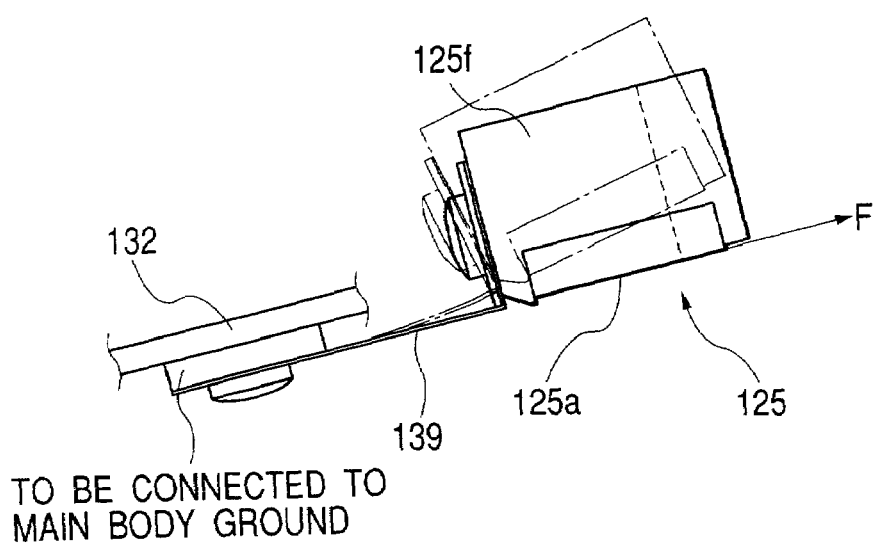
FIG. 7 is a partially enlarged view of the reading section showing the third embodiment of the present invention.

FIG. 7 is a partially enlarged view of the back side reading portion 125 showing the third embodiment of the present invention.

In FIG. 7, the sensor housing 125*f* of the back side reading portion 125 is constructed in such structure that the housing is elastically supported so as to be displaceable in the direction substantially perpendicular to the image reading surface 125*a*, by an electroconductive leaf spring 139 connected to the ground in the main body of the apparatus not shown and that the image reading surface 125*a* is urged against the back side white reference 126.

The leaf spring 139 is connected and supported on the almost same plane as the image reading surface 125*a*, which achieves the following effect.

Namely, during transportation of the original S, the friction between the image reading surface 125*a* and the original S produces a frictional force F toward the downstream in the transporting direction, but this frictional force F is normally small and thus causes little influence on the back side reading portion 125.

However, there are cases where the frictional force F becomes extraordinarily large because of influence of static electricity or the like.

Figure 6:
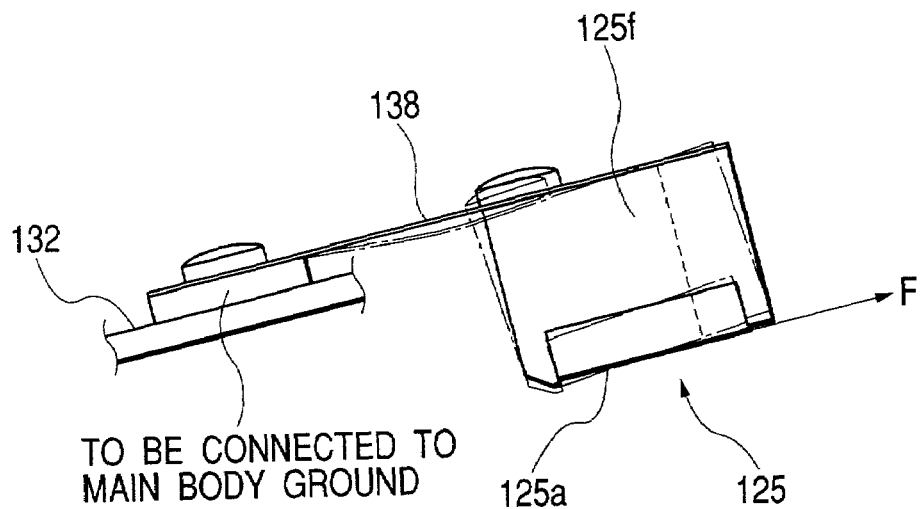
FIG. 6 is a partial view of the reading section showing a modification example of the second embodiment of the present invention.

In such cases, the structure of the second embodiment shown in FIG. 6 conceivably produces such a moment as to move the image reading surface 125*a* in the transporting direction whereby the leaf spring 138 might be warped to deviate the reading position. In contrast to it, in the case of the third embodiment, since the leaf spring 139 is connected and supported on the almost same surface as the image reading surface 125*a*, there appears no such moment as to move the image reading surface 125*a* in the transporting direction.

Accordingly, the structure of the present embodiment prevents the leaf spring 139 from being warped by the frictional force F acting on the image reading surface 125*a*, and is thus free of the defect of deviation of the reading position, so as to implement reading in high resolution.

(Fourth Embodiment)

The detailed structure of a front side reading portion 223, a front side white reference 224, a back side reading portion 225, and a back side white reference 226, which are features of the fourth embodiment, will be described below referring to the partially enlarged view of the reading section presented in FIG. 8. The description of the same members (Like members have the prefix 200 with the same last two digits.) as in FIG. 3 will be omitted.

Figure 8:
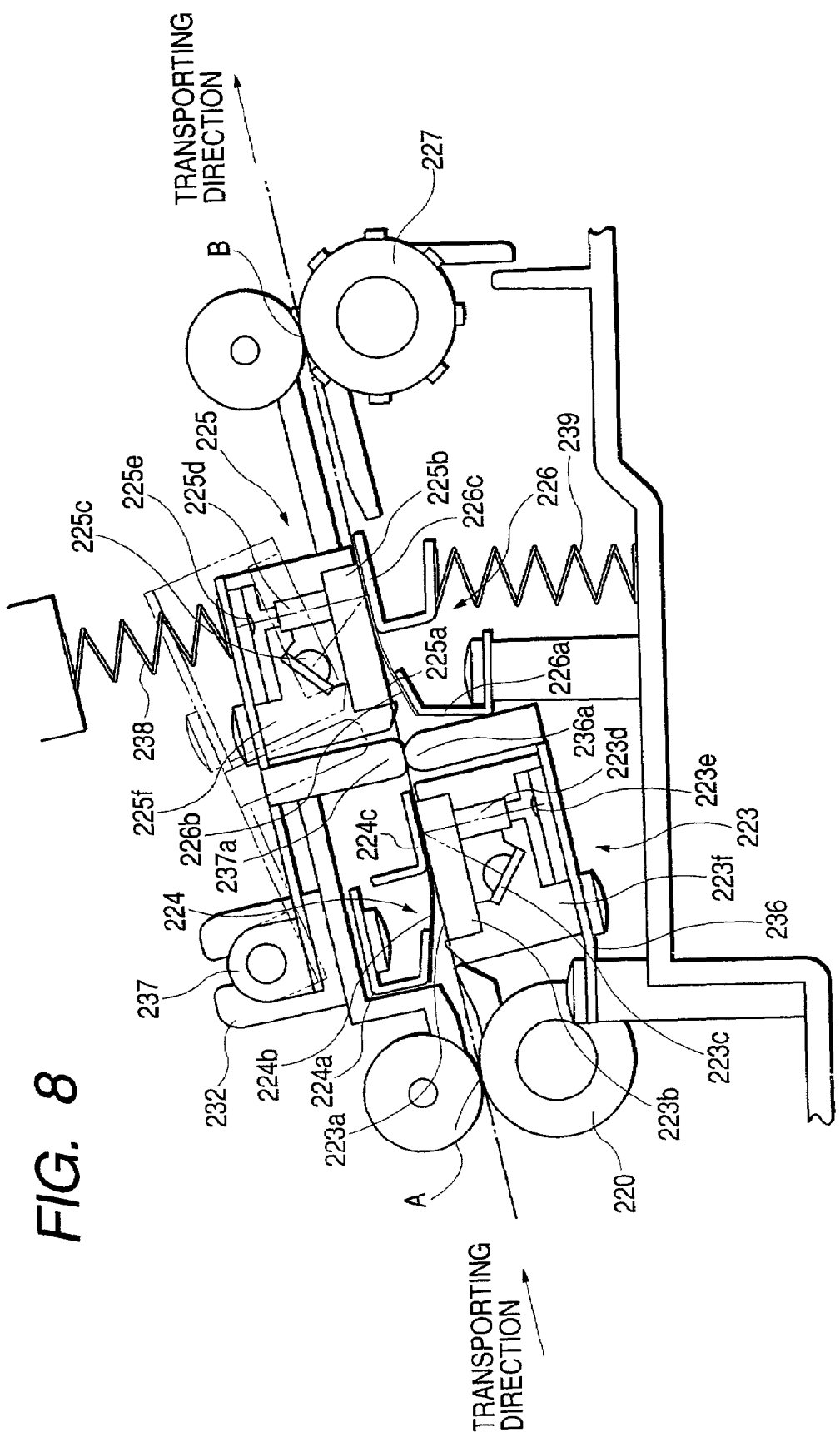
FIG. 8 is an enlarged view of a cross section of an image reading apparatus as the fourth embodiment.

As shown in FIG. 8, the front side reading portion 223 is a general-purpose reading device typified by the contact image sensors, and is constructed to illuminate the original placed in close contact on the contact glass plate 223*b* defining the image reading surface 223*a*, with light from the light source 223*c*, image the light reflected back from the original onto the photoelectric conversion element 223*e* through the short-focus imaging lens 223*d*, and convert the optical signal bearing the image information of the original, into the electric signal with the photoelectric conversion element 223*e*, thereby effecting reading of the image information.

The contact glass plate 223*b*, the light source 223*c*, the short-focus imaging lens 223*d*, and the photoelectric conversion element 223*e* are integrally housed in the sensor housing 223*f*, and the sensor housing 223*f* is fixed and supported by a front side image reading means holder 236 so that the image reading surface 223*a* is substantially coplanar with the plane connecting the original nip point A of the transportation roller 220 to the original nip point B of the delivery roller 227.

The front side white reference 224 is comprised of a stationary, front side white reference mount plate 224*a*, a white, front side flexible sheet material 224*b* the upstream side of which is stuck to the front side white reference mount plate 224*a*, and a front side white reference pressure plate 224*c* stuck to a downstream free end of the front side flexible sheet material 224*b*, and is constructed to urge the original against the image reading surface 223*a* of the front side reading portion 223 with the own weight of the front side white reference pressure plate 224*c*.

The back side reading portion 225 is also a general-purpose reading device typified by the contact image sensors, as the front side reading portion 223 was. The back side reading potion 225 is constructed to illuminate the original placed in close contact on the contact glass plate 225*b* defining the image reading surface 225*a*, with light from the light source 225*c*, image the light reflected back from the original onto the photoelectric conversion element 225*e* through the short-focus imaging lens 225*d*, and convert the optical signal bearing the image information of the original, into the electric signal with the photoelectric conversion element 225*e*, thereby effecting reading of the image information.

The contact glass plate 225*b*, the light source 225*c*, the short-focus imaging lens 225*d*, and the photoelectric conversion element 225*e* are integrally housed in the sensor housing 225*f*, and the sensor housing 225*f* is constructed in such structure that the housing is mounted on the back side image reading means holder 237 supported so as to be rotatable relative to the middle transportation frame 232 and is urged toward the back side white reference 226 by an image reading device pressing spring 238 being reading urging means.

Figure 9:
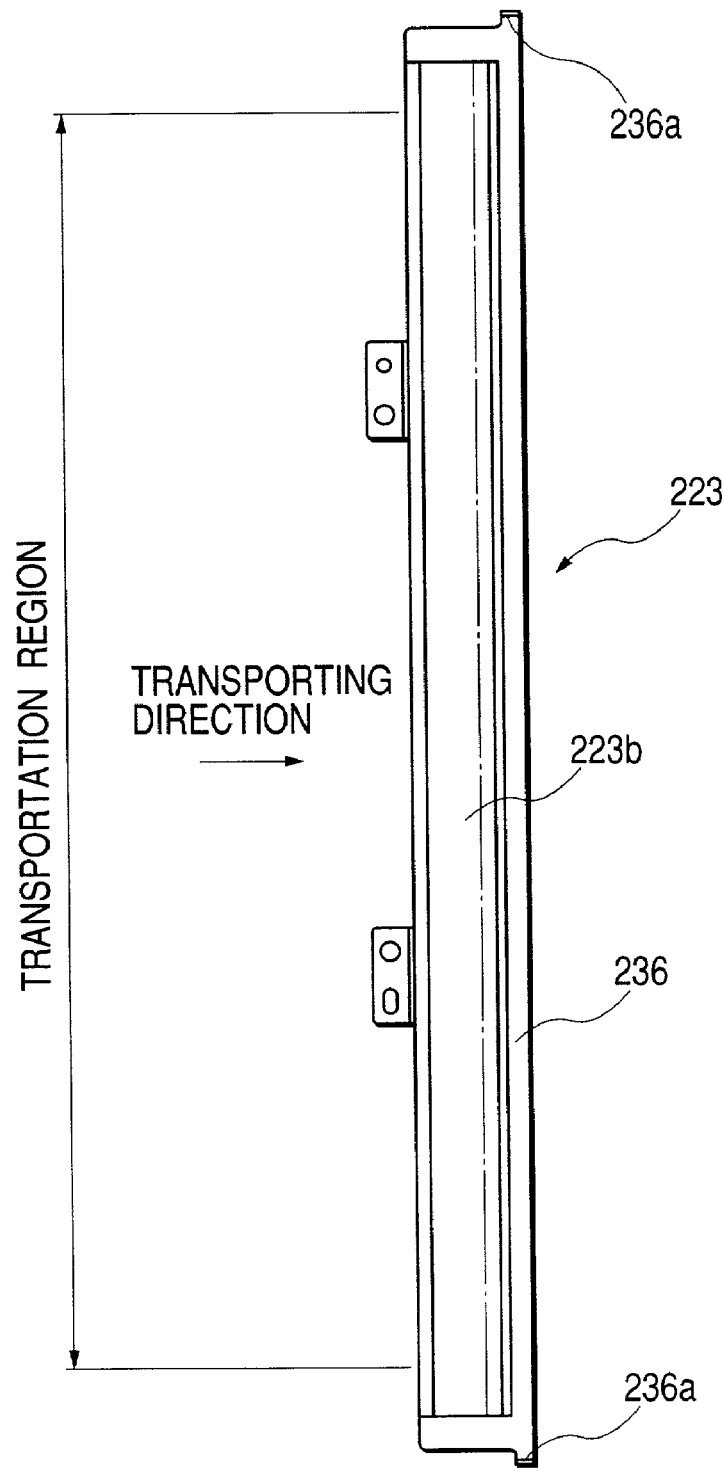
FIG. 9 is a plan view of a front side reading portion in the fourth embodiment.

The apparatus is constructed so that front side abutting portions 236*a* as first abutting means provided integrally with the front side image reading means holder 236 at the opposed ends outside the original width defining an original transportable region (original transportation region), in the direction (main scanning direction) perpendicular to the original transporting direction, as shown in FIG. 9, are arranged to be opposed to and abut against back side abutting portions 237*a* as second abutting means provided integrally with the back side image reading means holder 237 at the opposed ends whereby the image reading surface 225*a* of the back side reading portion 225 and the image reading surface 223*a* of the front side reading portion 223 are substantially coplanar with each other, i.e., substantially coplanar with the plane connecting the original nip point A of the transportation roller 220 to the original nip point B of the delivery roller 227.

Accordingly, the original is prevented from being bent during transportation by the transportation roller 220 and the delivery roller 223 and thus can be stably transported without resistance. At the same time as it, the front side of the original is securely kept in close contact with the image reading surface 223*a* of the front side reading portion 223 while the back side of the original is kept in close contact with the image reading surface 225*a* of the back side reading portion 225. Therefore, the images can be read without the reading failure such as defocus or the like.

The back side white reference 226 is comprised of a stationary, back side white reference mount plate 226*a*, a white, back side flexible sheet material 226*b* the upstream side of which is stuck to the back side white reference mount plate 226*a*, and a back side white reference pressure plate 226*c* stuck to the downstream free end of the back side flexible sheet material 226*b*.

A white reference plate pressing spring 239 is arranged to press the back side white reference pressure plate 226*c* against the image reading surface 225*a* of the back side reading portion 225, thereby urging the original against the image reading surface 225*a* of the back side reading portion 225.

Since the pressure of the white reference plate pressing spring 239 is set smaller than that of the image reading device pressing spring 238, for example, in the case of a thick original passing, the back side white reference pressure plate 226*c* side rocks but the back side reading portion 225 does not rock. For that reason, the back side reading portion 225 does not deviate during reading, so as to be able to perform stable reading operation.

As described above, the apparatus is constructed in the structure wherein the front side reading portion 223 is supported in the fixed state and wherein the back side reading portion 225 is supported in the rotatable state, and the apparatus has the front side abutting portions 236*a* and the back side abutting portions 237*a* abutting against each other outside the original transportation region while being provided respectively at the front side reading portion 223 and at the back side reading portion 225; the image reading device pressing spring 238 for urging the back side reading portion 225 in the direction in which the back side abutting portions 237*a* abut against the front side abutting portions 236*a*; the front side white reference 224 arranged at the position opposite to the front side reading portion 223 so that the original is urged toward the image reading surface 223*a* of the front side reading portion 223 and having the color of white being the color reference of the front side reading portion 223; and the back side white reference 226 arranged at the position opposite to the back side reading portion 225 so that the original is urged toward the image reading surface 225*a* of the back side reading portion 225 and having the color of white being the color reference of the back side reading portion 225, wherein in the abutting state of the front side abutting portions 236*a* and the back side abutting portions 237*a* the image reading surface 223*a* of the front side reading portion 223 and the image reading surface 225*a* of the back side reading portion 225 are substantially coplanar with each other.

This permits the image reading surface 223*a* of the front side reading portion 223 and the image reading surface 225*a* of the back side reading portion 225 to be positioned with high accuracy and arranged on the almost same plane, without needs for any complicated mechanism or adjustment at all, so that the original can be transported without occurrence of transportation failure of a jam or the like. In addition, the image reading surface 223*a* of the front side reading portion 223 and the image reading surface 225*a* of the back side reading portion 225 both can be securely kept in close contact with the original, which permits the images to be read without occurrence of the reading failure of defocus or the like.

(Fifth Embodiment)

Figure 10:
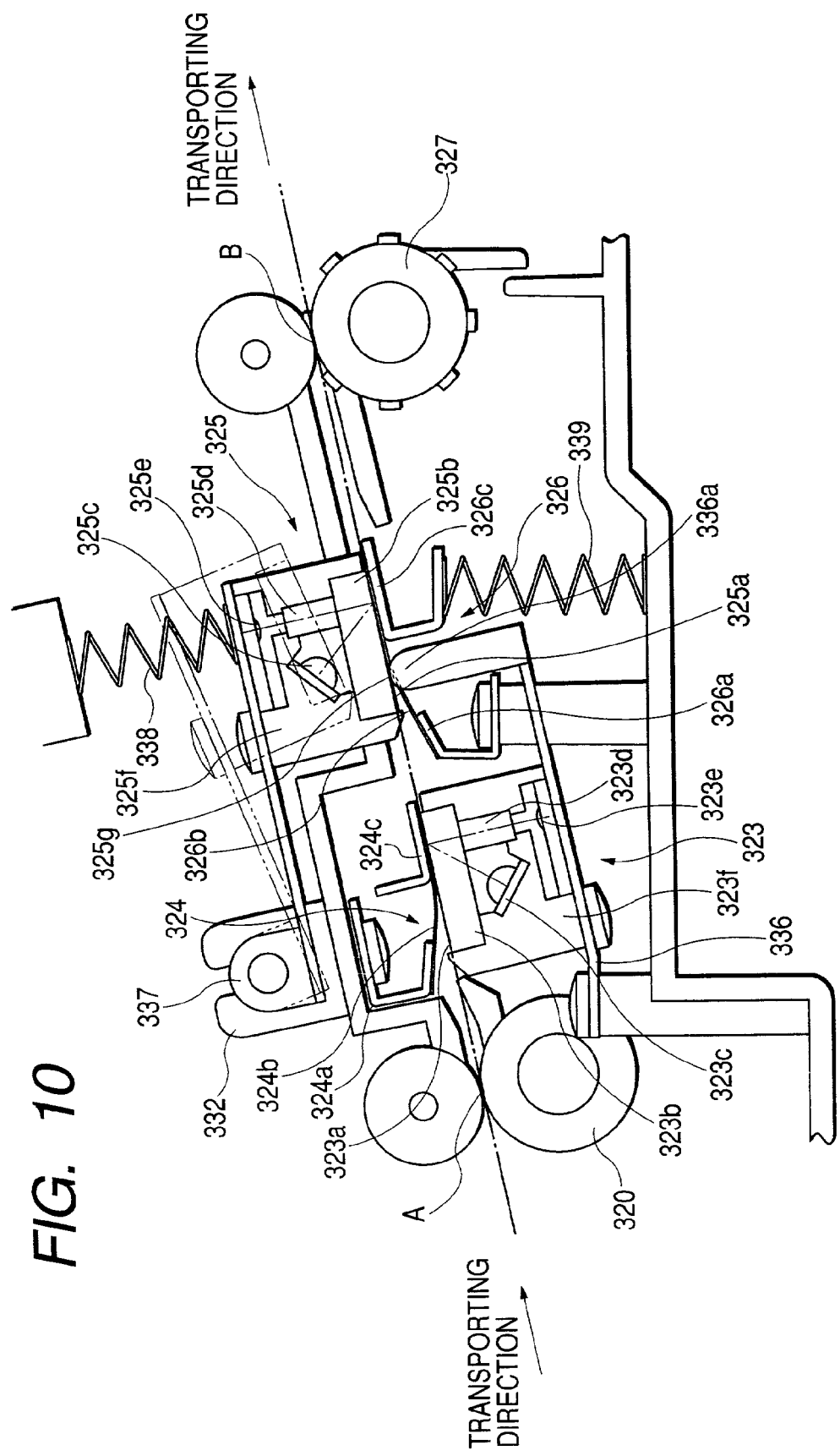
FIG. 10 is an enlarged view of a cross section of an image reading apparatus as the fifth embodiment.

A facsimile apparatus will be exemplified as the fifth embodiment of the present invention and will be described referring to the drawing. FIG. 10 is an enlarged view of a cross section of the image reading apparatus in the fifth embodiment. In the following description, members similar to those in the fourth embodiment will be denoted by similar part numbers (Like members have the prefix 300 with the same last two digits.) and the description thereof will be omitted.

In FIG. 10, the front side abutting portions 336a as first abutting means provided integrally with the front side image reading means holder 336 at the opposed ends outside the original width defining the original transportable region, in the direction (main scanning direction) perpendicular to the original transporting direction, are arranged to abut against the back side abutting portions 325g as second abutting means set outside the original transportation region at the opposed ends of the contact glass plate 325b defining the image reading surface 325a of the back side reading portion 325.

This permits the image reading surface 323a of the front side reading portion 323 and the image reading surface 325a of the back side reading portion 325 to be substantially coplanar with each other, i.e., to be placed on the almost same plane as the plane connecting the original nip point A of the transportation roller 320 to the original nip point B of the delivery roller 327, with higher accuracy than in the fourth embodiment.

Similar effect can also be achieved by such a configuration that the back side abutting portions 237a provided integrally with the back side image reading means holder 237 in the fourth embodiment are arranged to abut against the opposed ends of the contact glass plate 223b defining the image reading surface 223a of the front side reading portion 223.

As described above, the fifth embodiment is characterized in that either the image reading surface 323a of the front side reading portion 323 or the image reading surface 325a of the back side reading portion 325 functions as abutting means.

(Other Embodiments)

In the foregoing embodiments the image reading apparatus of the present invention was described with the examples of application to the facsimile machines, but, without having to be limited to the examples, the apparatus of the invention can also be used alone as a scanner or may be additionally mounted as image reading means in the image forming apparatus or the copying apparatus.

(Sixth Embodiment)

Figure 11:
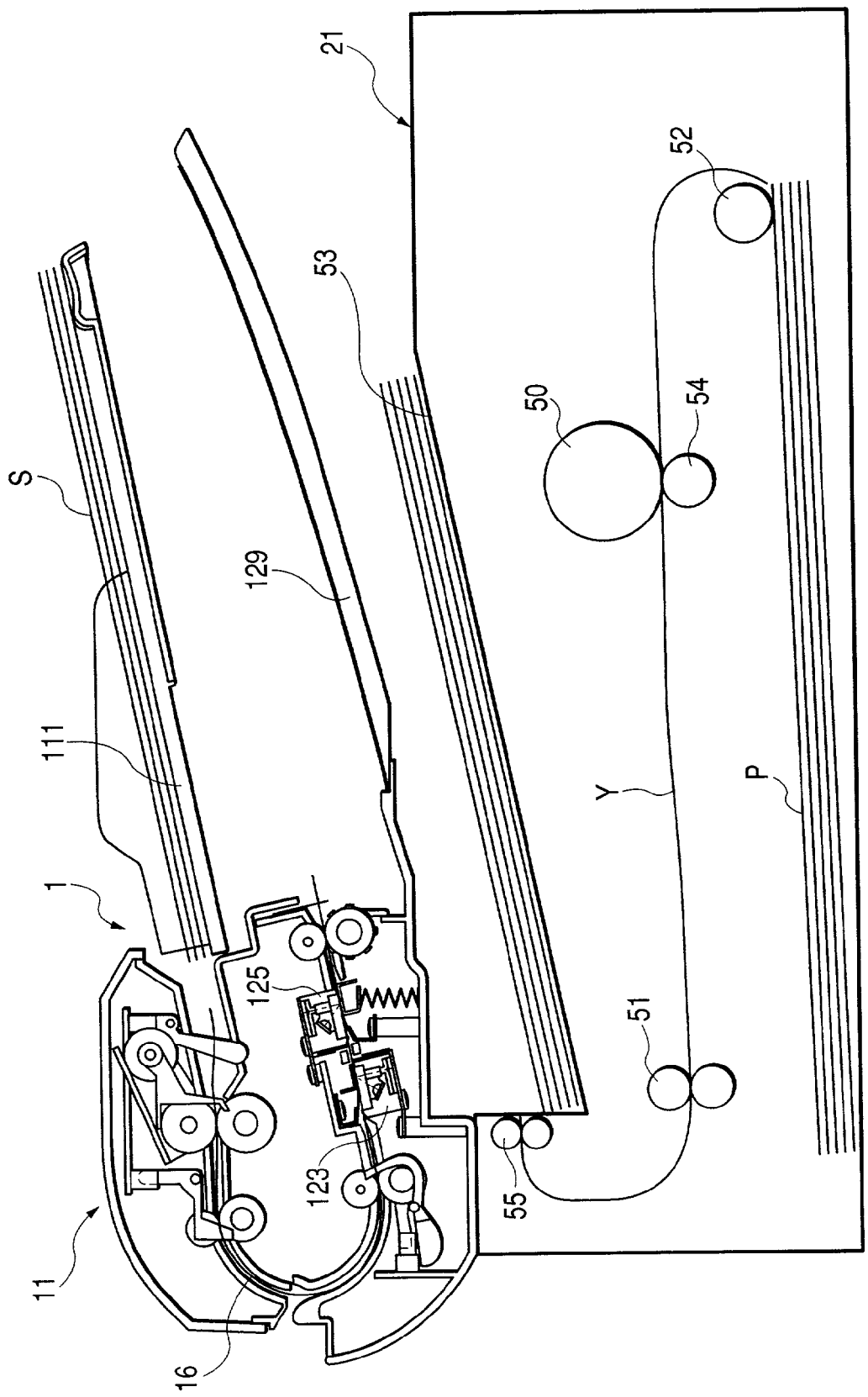
FIG. 11 is a schematic front sectional view of the major part of an image forming apparatus equipped with the image reading apparatus.

FIG. 11 is a schematic front sectional view of a facsimile machine.

The facsimile machine 1 is constructed to read a sheet with an image formed thereon (hereinafter referred to as "original") S, send information thereof to another facsimile machine or receive information from another facsimile machine, and record the information on a recording sheet P being a recording medium. Further, the facsimile machine 1 also has a function as a copier for reading the original and making a copy thereof.

The facsimile machine 1 is comprised of an image reading device 11 for reading the original S, a recording section 21 for recording an image read by the image reading device 11 or a received image on a recording sheet, an operation section 31 for permitting the user to operate the facsimile machine, a control section, not shown, for controlling sending/receiving and copying operations, and so on.

At the recording section 21, a recording sheet P is fed to between a photosensitive drum (image forming means) 50 and a transferring unit 54 by a feed roller 52. On the photosensitive drum 50, information from another facsimile machine, or information read by the image reading device 11 is formed as a toner image. The transferring unit 54 transfers the toner image onto the recording sheet fed between the photosensitive drum 50 and the transferring unit 54. Then a fixing device 51 heats and pressurizes the recording sheet P to fix the toner image permanently. Lastly, a delivery roller pair 55 delivers the recording sheet onto a sheet delivery tray 53.

In the next place, a front side reading portion (image reading means or first image reading means) 423, a front side white reference portion (pressing means or first pressing means) 424, a back side reading portion (image reading means or second image reading means) 425, and a back side white reference portion 426 (pressing means or second pressing means) of the sixth embodiment will be described below with reference to the partially enlarged view of the reading section illustrated in FIG. 12.

Figure 12:
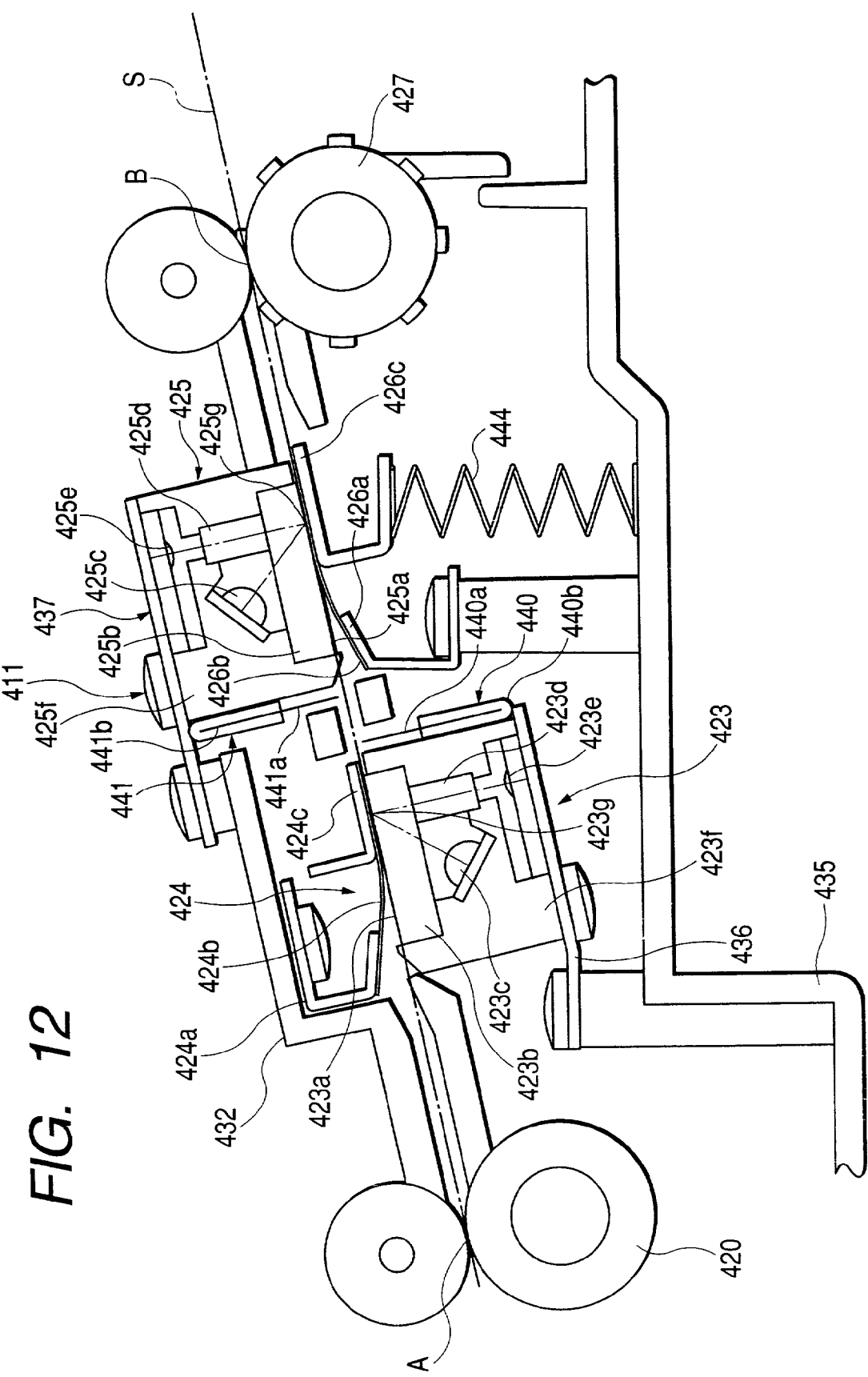
FIG. 12 is a schematic front sectional view of the major part of an image reading apparatus as the sixth embodiment equipped with charge eliminating devices.

In FIG. 12, the front side reading portion 423 is a general-purpose reading portion typified by the contact image sensors. The front side reading portion 423 is constructed to illuminate the original S placed in close contact on the contact glass plate 423b defining the image reading surface 423a, with light from the light source 423c, image the light reflected back from the front side reading point (image reading position) 423g of the original S onto the photoelectric conversion element 423e through the short-focus imaging lens 423d, and convert the optical signal bearing the image information of the original S, into the electric signal by the photoelectric conversion element 423e, thereby effecting reading of the image information.

The contact glass plate 423b, the light source 423c, the short-focus imaging lens 423d, and the photoelectric conversion element 423e are integrally housed in the sensor housing 423f. Further, the sensor housing 423f is fixed and supported on the lower transportation cover 435 by the front side reading portion holder 436 so that the image reading surface 423a is substantially coplanar with the plane connecting the original nip point A of the transportation roller 420 to the original nip point B of the delivery roller 427.

The front side white reference portion 424 is comprised of a stationary mount plate 424a, a flexible sheet material (pressing member) 424b of polyester sheet the upstream side of which is stuck to the mount plate 424a, and a metal plate 424c stuck to the downstream free end of the flexible sheet material 424b. The front side white reference portion 424 is arranged to urge the original S against the image reading surface 423a of the front side reading portion 423 by the own weight of the metal plate 424c, thereby suppressing a rise of the original at the front side reading point 423g.

On the other hand, the back side reading portion 425 is also a general-purpose reading portion typified by the contact image sensors, as the front side reading portion 423 was. The back side reading portion 425 is constructed to illuminate the back side reading point (image reading position) 425g for reading the original S placed in close contact on the contact glass plate 425b defining the image reading surface 425a, with light from the light source 425c, image the light reflected back from the original S onto the photoelectric conversion element 425e through the short-focus imaging lens 425d, and convert the optical signal bearing the image information of the original S, into the electric signal with the photoelectric conversion element 425e, thereby effecting reading of the image information.

The contact glass plate 425b, the light source 425c, the short-focus imaging lens 425d, and the photoelectric conversion element 425e are integrally housed in the sensor housing 425f. Further, the sensor housing 425f is fixed and supported on the middle transportation frame 432 by the back side reading portion holder 437 so that the image reading surface 425a is substantially coplanar with the plane connecting the original nip point A of the transportation roller 420 to the original nip point B of the delivery roller 427, as in the case of the front side reading portion 423.

The back side white reference portion 426, similar to the front side white reference portion 424, is comprised of a stationary mount plate 426a, a white, flexible sheet material (pressing member) 426b of polyester the upstream side of which is stuck to the mount plate 426a, and a metal plate 426c stuck to the downstream free end of the flexible sheet material 426b. The back side white reference portion 426 is arranged to urge the flexible sheet material 426b through the metal plate 426c by the pressing spring 444 so as to urge the original S against the image reading surface 425a of the back side reading portion 425, thereby suppressing a rise of the original at the back side reading point 425g.

Described below are a front-side charge eliminating brush (charge eliminating means or first charge eliminating means) 440 and a back-side charge eliminating brush (charge eliminating means or second charge eliminating means) 441 of the present embodiment.

The front-side charge eliminating brush 440 is comprised of a brush portion 440a and a metal plate 440b. The metal plate 440b is secured to the front side reading portion 423. A distal end of the brush portion 440a is located a little below the image reading surface 423a and is arranged to eliminate a charge accumulated on the front side of the original S at the position near the original. The metal plate 440b is connected to the ground of the housing through an unrepresented earth. Accordingly, the front-side charge eliminating brush 440 is arranged to lead the charge eliminated by the brush portion 440a, via the metal plate 440b to the ground.

The original S is urged from the back side thereof against the contact glass plate 423b of the front side reading portion 423 by the white, flexible sheet material 424b while being transported, whereby there occurs friction between the original S and the contact glass plate 423b, so as to accumulate static electricity on the front side of the original. However, the static electricity is eliminated immediately thereafter by the front-side charge eliminating brush 440. For this reason, the original is smoothly transported even after entry into the back side reading point 425g, without adhering to the white, flexible sheet material 426b on the front side of the original.

The back-side charge eliminating brush 441 is also comprised of a brush portion 441a and a metal plate 441b. The metal plate 441b is fixed to the back side reading portion 425, as in the front-side charge eliminating brush 440. A distal end of the brush portion 441a is located a little above the image reading surface 425a and arranged to eliminate a charge accumulated on the back side of the original S at the position near the original. The metal plate 441b is connected to the ground of the housing through an unrepresented earth. Accordingly, the back-side charge eliminating brush 441 is arranged to discharge the charge eliminated by the brush portion 441a, via the metal plate 441b to the ground.

The original S is urged from the back side thereof against the contact glass plate 425b of the back side reading portion 425 by the white, flexible sheet material 426 while being transported, whereby there occurs friction between the original S and the flexible sheet material 426b, so as to accumulate a charge of static electricity on the back side of the original. However, the static electricity is eliminated immediately thereafter by the back-side charge eliminating brush 441. For this reason, the original is smoothly transported even after entry into the back side reading point 425g, without adhering to the back side contact glass plate 425b.

As constructed in the above structure, the image reading apparatus 411 is able to securely eliminate the static electricity accumulated on the original, by the front-side charge eliminating brush 440 and the back-side charge eliminating brush 441. For this reason, the image reading apparatus 411 prevents the original having passed the front side reading portion 423, from adhering to the flexible sheet material 426b or to the contact glass plate 425b, thus causes no original jam, and is able to transport the original securely and smoothly and thus read the image of the original securely.

Since the image reading apparatus 411 is able to securely eliminate the static electricity accumulated on the original, the original can be securely urged against the image reading surface 423a of the front side reading portion 423 and against the image reading surface 425a of the back side reading portion 425 to be kept in close contact. For this reason, the image reading apparatus 411 is able to read the original securely, without occurrence of defocus at the front side reading portion 423 and at the back side reading portion 425.

Further, since the image reading apparatus 411 is able to securely eliminate the static electricity accumulated on the original, the static electricity is prevented from causing discharge from the original to the other members. For this reason, no discharge noise enters the front side reading portion 423 and the back side reading portion 425, which prevents malfunctions and breakage of the front side reading portion 423 and the back side reading portion 425.

Since the image reading apparatus 411 has the U-shaped transportation path 16 (FIG. 11) upstream of the front side reading portion 423 and the back side reading portion 425, there is a possibility of accumulating static electricity on the original because of friction between the original and the transportation surfaces of the U-shaped transportation path 16 during transportation of the original. However, since the image reading apparatus 411 is able to eliminate the static electricity by the front-side charge eliminating brush 440 and the back-side charge eliminating brush 441, the transportation failure can be prevented at the front side reading portion 423 and at the back side reading portion 425. Further, the front side reading portion 423 and the back side reading portion 425 are prevented from causing a malfunction of reading or from being damaged.

The image reading apparatus 411 of the sixth embodiment employs the charge eliminating brushes for eliminating the charge from the original, but similar charge eliminating effect can also be achieved by other configurations; for example, the charge can also be eliminated by using electroconductive sheets or the like and arranging them in contact with the original.

Further, the image reading apparatus 411 of the sixth embodiment is arranged to eliminate the charge on the two sides of the original by the front-side charge eliminating brush 440 and the back-side charge eliminating brush 441, but the charge eliminating effect similar to the above can also be achieved by providing either one of the front-side charge eliminating brush 440 and the back-side charge eliminating brush 441 so as to eliminate the charge from the original.

Namely, for example, in the case of only the front-side charge eliminating brush 440 being provided, since the charge is eliminated from the front side of the original, the original is smoothly transported without adhering to the back-side, white, flexible sheet material 426b, even after entry of the original into the back side reading point 425g. In the case of only the back-side charge eliminating brush 441 being provided, since the charge is eliminated from the back side of the original, the original is smoothly transported without adhering to the back-side contact glass plate 425b, even after entry of the original into the back side reading point 425g.

It is, however, a matter of course that the transportation performance and the charge eliminating effect can be enhanced more by provision of both the front-side charge eliminating brush 440 and the back-side charge eliminating brush 441.

In the sixth embodiment the polyester sheets were used as the flexible sheet materials 424b, 426b being the members for pressing the original in the image reading apparatus 411, but it is also feasible to enhance the transportation performance and the charge eliminating effect by provision of at least either one of the front-side charge eliminating brush 440 and the back-side charge eliminating brush 441 even in cases where the pressing members are other sheetlike nonconductive plastics or rigid bodies, for example, in cases where the pressing members are a nonconductive general-purpose resin such as an acrylonitrile-butadiene-styrene ternary copolymer (ABS), polystyrene (PS), polycarbonate (PC), etc., though charge is also accumulated on the original by friction between the pressing members and the original.

(Image Reading Apparatus of the Seventh Embodiment)

Figure 13:
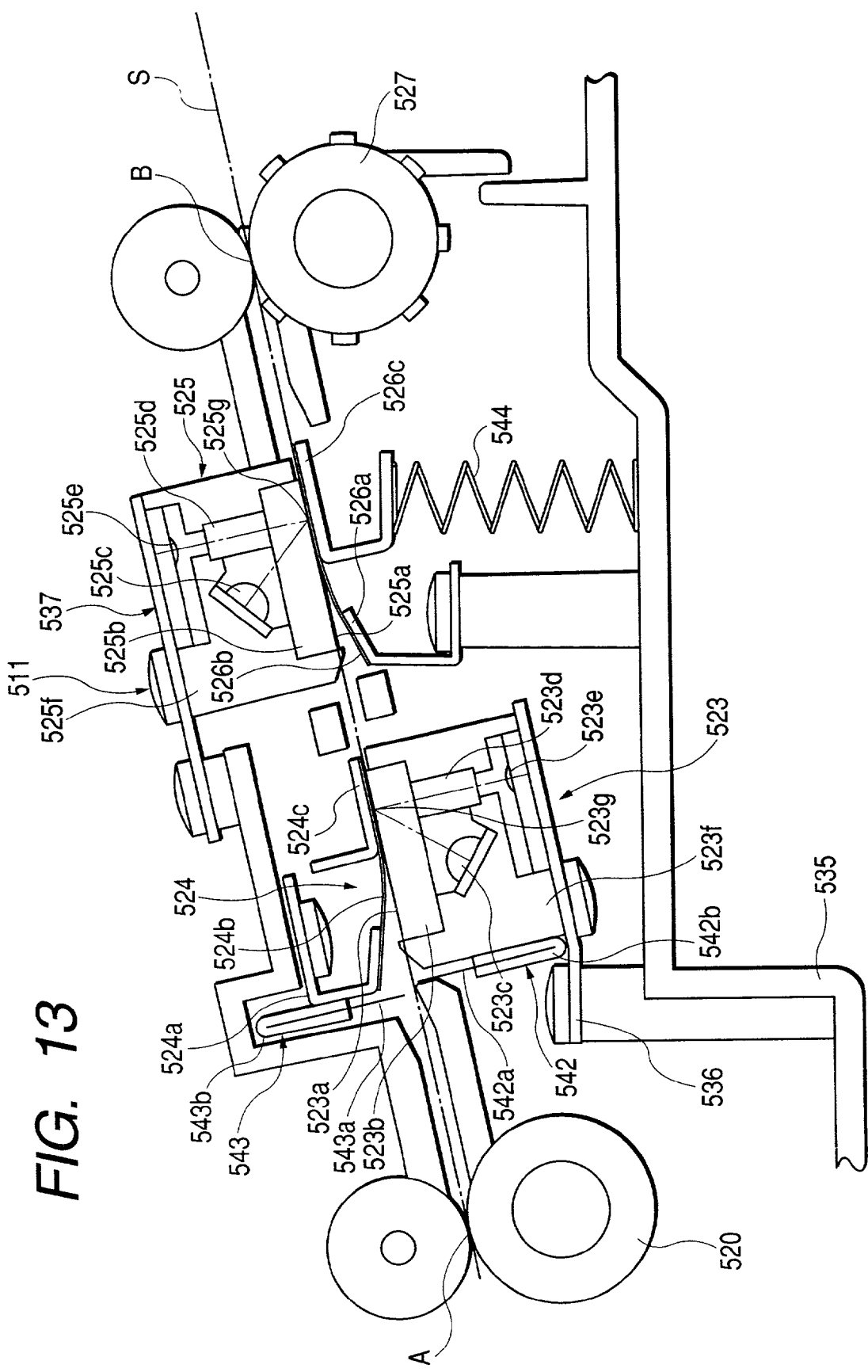
FIG. 13 is a schematic front sectional view of the major part of an image reading apparatus as the seventh embodiment equipped with charge eliminating devices.

In the image reading apparatus 411 of the sixth embodiment the front-side charge eliminating brush 440 and the back-side charge eliminating brush 441 were placed between the front side reading portion 423 and the back side reading portion 425, whereas the image reading apparatus 511 of the seventh embodiment is constructed, as shown in FIG. 13, in such structure that the front-side charge eliminating brush (charge eliminating means or first charge eliminating means) 542 and the back-side charge eliminating brush (charge eliminating means or second charge eliminating means) 543 are placed upstream of the front side reading portion 523. In the image reading apparatus 511 of the seventh embodiment, the same portions as those in the image reading apparatus 411 of the sixth embodiment are denoted by the same reference symbols (Like members have the prefix 500 with the same last two digits.) and the description thereof will be omitted.

The front-side charge eliminating brush 542 is comprised of a brush portion 542a and a metal plate 542b. The metal plate 542b is fixed to the front side reading portion 523. The distal end of the brush portion 542a is located a little below the plane of the image reading surface 523a so as to eliminate the charge accumulated on the front side of the original S at the position near the original. The metal plate 542b is connected to the ground of the housing through an unrepresented earth. Accordingly, the front-side charge eliminating brush 542 is arranged to discharge the charge eliminated by the brush portion 542a, via the metal plate 542b to the ground, thereby preventing the original from adhering to the contact glass plate 523b.

The back-side charge eliminating brush 543 is comprised of a brush portion 543a and a metal plate 543b. The metal plate 543b is fixed to the front side white reference portion 524. The distal end of the brush portion 543a is located a little above the plane of the image reading surface 523a so as to eliminate the charge accumulated on the back side of the original S at the position near the original. The metal plate 543b is connected to the ground of the housing through an unrepresented earth. Accordingly, the back-side charge eliminating brush 543 is arranged to guide the charge eliminated by the brush portion 543a, via the metal plate 543b to the ground.

Since the back-side charge eliminating brush 543 is arranged to eliminate the charge mainly from the back side of the original as described above, the original is smoothly transported even after entry into the front side reading point 523g, without adhering to the front side white reference portion 524.

Since the image reading apparatus 511 of the seventh embodiment is also able to securely eliminate the static electricity accumulated on the original, the static electricity is prevented from causing discharge from the original to the other members. For this reason, no discharge noise enters the front side reading portion 523 and the back side reading portion 525, whereby the front side reading portion 523 and the back side reading portion 525 can be prevented from causing a malfunction or from being broken.

Since the image reading apparatus 511 of the present embodiment also has the U-shaped transportation path 16 (FIG. 11) upstream of the front side reading portion 523 and the back side reading portion 525, there is a possibility of accumulating static electricity on the original by friction of the original against the transportation surfaces of the U-shaped transportation path 16 during transportation of the original. Particularly, since the guide plates of the U-shaped transportation path 16 are recently made of a plastic material, it is easier for the original to be charged with static electricity. However, since the image reading apparatus 511 is arranged to eliminate the static electricity accumulated on the original, by the front-side charge eliminating brush 542 and the back-side charge eliminating brush 543 before entry of the original into the front side reading portion 523, it is feasible to securely eliminate the adverse effect due to charging. Namely, the image reading apparatus 511 of the seventh embodiment can also enhance the transportation performance and the charge eliminating effect.

Further, the image reading apparatus 511 of the seventh embodiment is arranged to eliminate the charge from the two sides of the original by the front-side charge eliminating brush 542 and the back-side charge eliminating brush 543, but the charge eliminating effect similar to the above can also be attained by effecting the elimination of charge from the original by provision of only either one of the front-side charge eliminating brush 542 and the back-side charge eliminating brush 543.

It is, however, a matter of course that the transportation performance and the charge eliminating effect can be enhanced more by provision of both the front-side charge eliminating brush 542 and the back-side charge eliminating brush 543.

(Image Reading Apparatus of the Eighth Embodiment)

Figure 14:
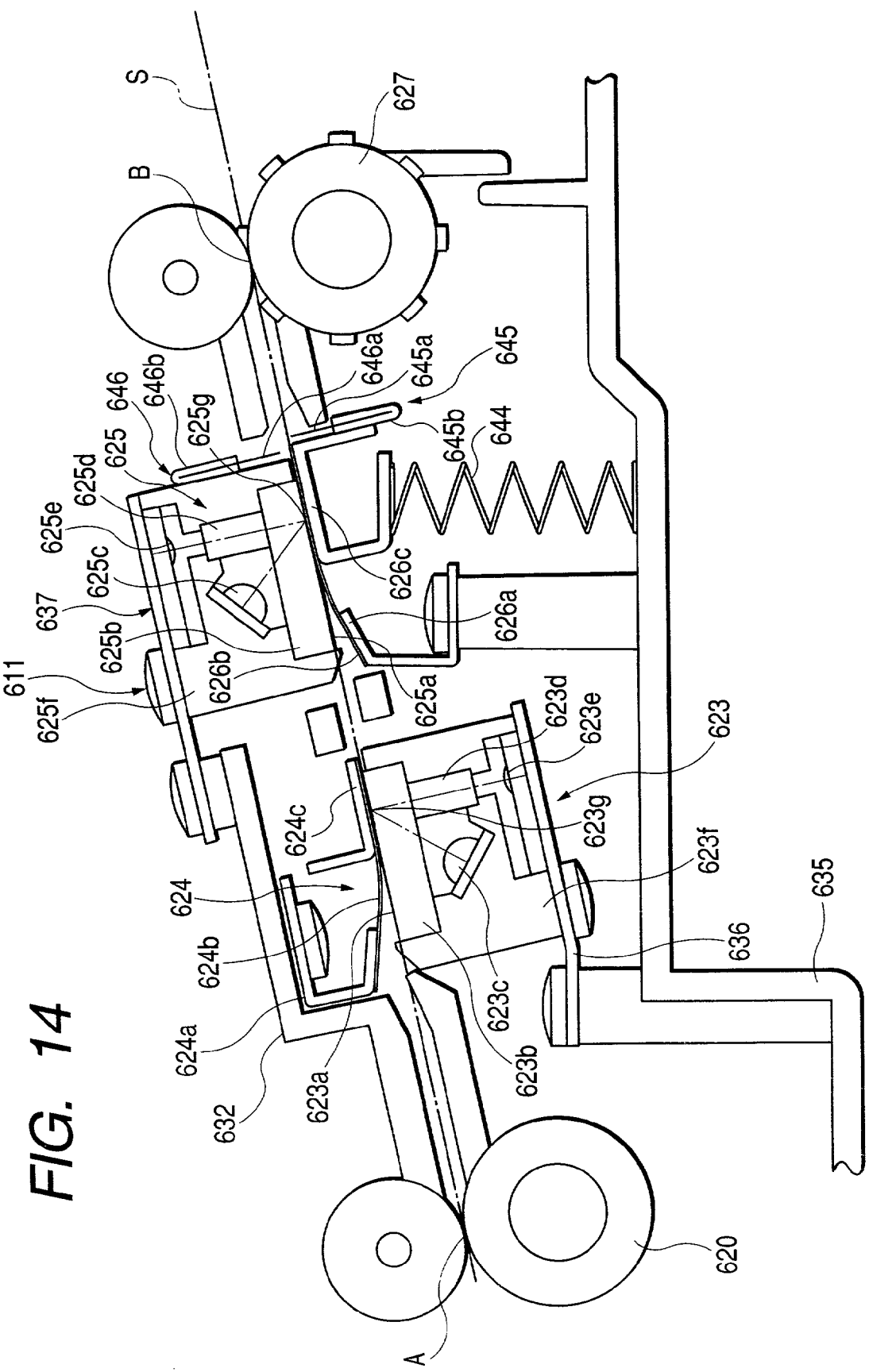
FIG. 14 is a schematic front sectional view of the major part of an image reading apparatus as the eighth embodiment equipped with charge eliminating devices.

In the image reading apparatus 611 of the eighth embodiment, as shown in FIG. 14, the front-side charge eliminating brush (charge eliminating means or first charge eliminating means) 645 and the back-side charge eliminating brush (charge eliminating means or second charge eliminating means) 646 are provided downstream of the back side reading portion 625. In the image reading apparatus 611 of the eighth embodiment, the same portions as those in the image reading apparatus 411 of the sixth embodiment are denoted by the same reference symbols (Like portions have the prefix 600 with the same last two digits.) and the description thereof will be omitted.

The front-side charge eliminating brush 645 is comprised of a brush portion 645*a* and a metal plate 645*b*. The metal plate 645*b* is fixed to the back side white reference portion 626. The distal end of the brush portion 645*a* is located a little below the plane of the image reading surface 625*a* so as to eliminate the charge accumulated on the front side of the original S at the position near the original. The metal plate 645*b* is connected through the pressing spring 644 and then through an unrepresented earth to the ground of the housing.

Accordingly, the front-side charge eliminating brush 645 is arranged to discharge the charge eliminated by the brush portion 645*a*, via the metal plate 645*b* to the ground.

Since the front-side charge eliminating brush 645 is arranged to eliminate the charge mainly from the front side of the original as described above, the charge is mainly eliminated from the front side of the original to be opposed to the original delivery tray 129 (FIG. 11), even during and after delivery of the original out of the apparatus onto the original delivery tray 129 by the delivery roller 627, so that the original is smoothly transported and stacked onto the tray without adhering to the original delivery tray 129 or to the original having already delivered and stacked on the original delivery tray 129.

On the other hand, the back-side charge eliminating brush 646 is comprised of a brush portion 646*a* and a metal plate 646*b*. The metal plate 646*b* is fixed to the back side reading portion 625. The distal end of the brush portion 646*a* is located a little above the back side of the image reading surface 625*a* so as to eliminate the charge accumulated on the back side of the original S at the position near the original. The metal plate 646*b* is connected to the ground of the housing through an unrepresented earth.

Accordingly, the back-side charge eliminating brush 646 is arranged to discharge the charge eliminated by the brush portion 646*a*, through the metal plate 646*b* to the ground.

Since the back-side charge eliminating brush 646 is arranged to eliminate the charge mainly from the back side of the original as described above, even if the next original is delivered onto the original which has already been delivered out of the apparatus and onto the original delivery tray 129 by the delivery roller 627, the charge is mainly eliminated from the back side of the original to be opposed to the succeeding original and thus the succeeding original is smoothly transported and stacked thereonto without adhering to the stacked original.

Since the image reading apparatus 611 of the eighth embodiment is also arranged to securely eliminate the static electricity accumulated on the original, the static electricity is prevented from causing discharge from the original to the other members. For this reason, no discharge noise enters the back side reading portion 625 and a metal shaft of the delivery roller 627, whereby it is feasible to prevent malfunctions and breakage of the back side reading portion 625 and the substrate of the apparatus.

Since the image reading apparatus 611 of the present embodiment also has the U-shaped transportation path 16 (FIG. 11) upstream of the front side reading portion 623 and the back side reading portion 625, there is a possibility of accumulating static electricity on the original because of friction of the original against the transportation surfaces of the U-shaped transportation path 16 during transportation of the original. Particularly, since the guide plates of the U-shaped transportation path 16 are recently made of a plastic material, it is easier for static electricity to be accumulated on the original. However, since the image reading apparatus 611 is arranged to eliminate the static electricity accumulated on the original, by the front-side charge eliminating brush 645 and the back-side charge eliminating brush 646 before delivery of the original onto the original delivery tray 129, it is feasible to eliminate the adverse effect due to charging securely. Namely, the image reading apparatus 611 of the eighth embodiment is also able to enhance the transportation performance and the charge eliminating effect.

In the image reading apparatus 611 of the eighth embodiment, the original stand 111 (FIG. 11) is arranged above and near the original delivery tray 129 for downsizing. However, the elimination of charge from the back side of the original makes it feasible to achieve good transportation performance while preventing the original from adhering to the bottom surface of the original stand 111.

The image reading apparatus 611 of the eighth embodiment employs the charge eliminating brushes for eliminating the charge from the original, but similar charge eliminating effect can also be attained by other configurations, for example, by using electroconductive sheets or the like and keeping them in contact with the original.

Further, the image reading apparatus 611 of the eighth embodiment is arranged to eliminate the charge from the two sides of the original by the front-side charge eliminating brush 645 and the back-side charge eliminating brush 646, but the charge eliminating effect similar to the above can also be attained by effecting the elimination of charge from the original by provision of only either one of the front-side charge eliminating brush 645 and the back-side charge eliminating brush 646.

Namely, for example, in the case of only the front-side charge eliminating brush 645 being provided, the charge is eliminated from the front side of the original. Even while and after the original is delivered out of the apparatus and onto the original delivery tray 129 by the delivery roller 627, the original is smoothly transported and stacked thereonto without adhering to the original delivery tray 129 or to the original having already been delivered and stacked on the original delivery tray 129, because the charge is mainly eliminated from the front side of the original to be opposed to the original delivery tray 129.

In the case of only the back-side charge eliminating brush 646 being provided, the charge is eliminated from the back side of the original. Even while and after the succeeding original is delivered onto the preceding original that has already been delivered out of the apparatus and onto the original delivery tray 129 by the delivery roller 627, the succeeding original is smoothly transported and stacked thereonto without adhering to the stacked original, because the charge is mainly eliminated from the back side of the preceding original to be opposed to the succeeding original.

It is, however, a matter of course that it is feasible to enhance the charge eliminating effect, the stacking performance, and the transportation performance more and reduce malfunctions due to static electricity more, by provision of both the front-side charge eliminating brush 645 and the back-side charge eliminating brush 646.

In the image reading apparatus 611 of the eighth embodiment the polyester sheets were used for the flexible sheet materials 624*b*, 626*b* being the members for pressing the original, and it is also feasible to enhance the transportation and stacking performance and the charge eliminating effect, by provision of at least one of the front-side charge eliminating brush 645 and the back-side charge eliminating brush 646, even in cases where the pressing members are made of another sheetlike nonconductive plastic material or rigid bodies, for example, in cases where the pressing members are made of a nonconductive general-purpose resin such as an acrylonitrile-butadiene-styrene ternary copolymer (ABS), polystyrene (PS), polycarbonate (PC), etc., though charge is accumulated on the original because of friction of the pressing members against the original.

In the image reading apparatus 411, 511, 611 of the sixth, seventh, and eighth embodiments described above, the charge eliminating brushes are arranged on the front side and on the back side of the original in their respective positional relations with the front side reading portion 423, 523, 623 and with the back side reading portion 425, 525, 625 wherein the front-side charge eliminating brush 440, 542, 645 and the back-side charge eliminating brush 441, 543, 646 are located at the position between the front side reading portion 423, 523, 623 and the back side reading portion 425, 525, 625, at the position upstream of the front side reading portion 423, 523, 623, or at the position downstream of the back side reading portion 425, 525, 625. It is also possible to combine two or three out of the three positions, the position upstream of the front side reading portion 423, 523, 623, the position between the front side reading portion 423, 523, 623 and the back side reading portion 425, 525, 625, and the position downstream of the back side reading portion 425, 525, 625. It is also feasible to enhance the transportation and stacking performance, by locating the respective charge eliminating brushes on at least one of the two sides of the front side and the back side of the original.

For example, a charge eliminating brush is located on the back side of the original (pressing means side) upstream of the front side reading portion 423, 523, 623 and another charge eliminating brush on the front side of the original (pressing means side) downstream of the back side reading portion 425, 525, 625. This configuration can achieve the effect of enhancing the transportation performance by charge elimination on the occasion of the original entering the front side reading portion 423, 523, 623 and the effect of enhancing the delivery stacking performance by elimination of charge from the original after reading of the back side.

It is, however, a matter of course that the transportation performance and the stacking performance can be enhanced more by provision of all the charge eliminating brushes in the sixth, seventh, and eighth embodiments.

(Image Reading Apparatus of the Ninth Embodiment)

Figure 15:
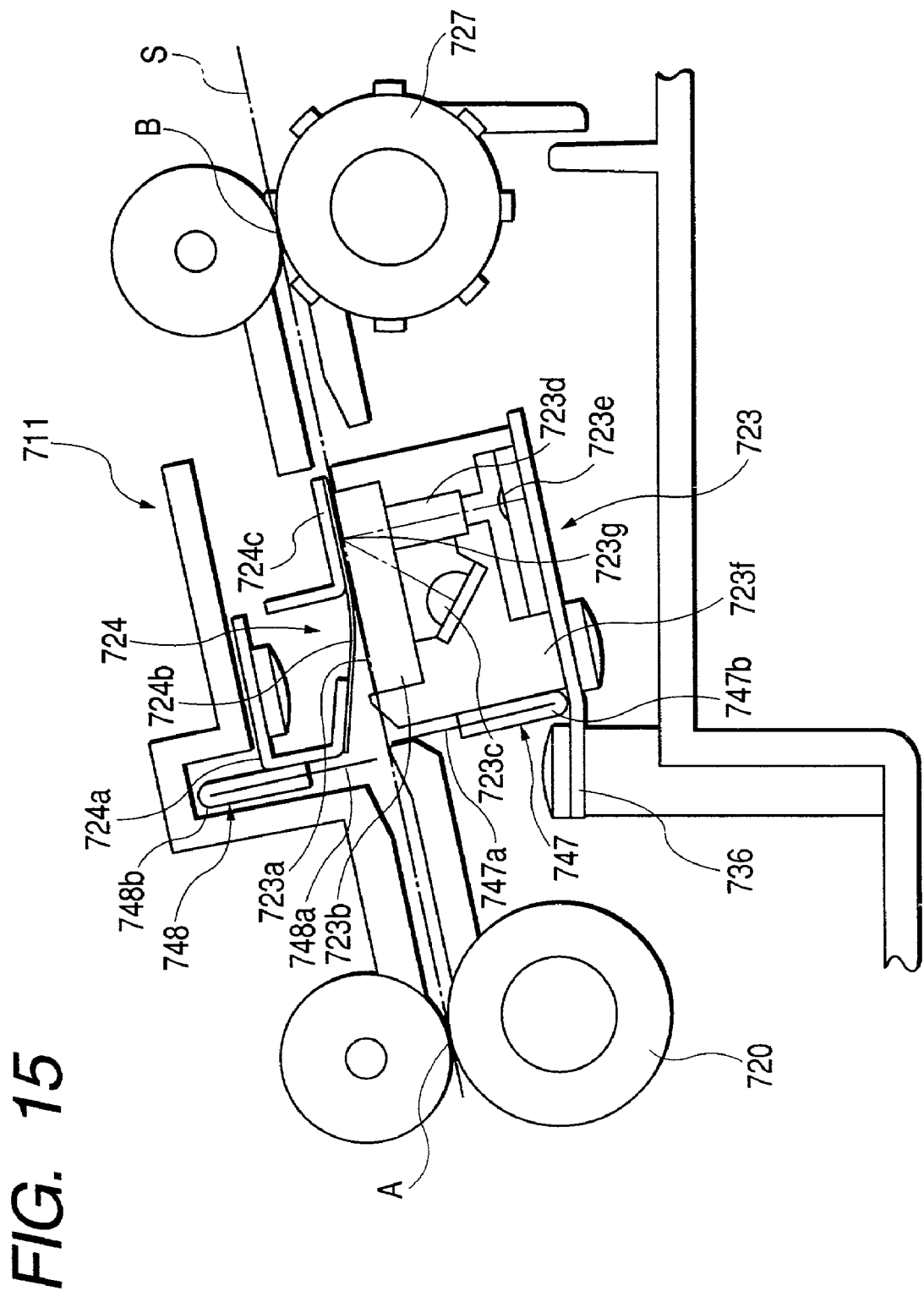
FIG. 15 is a schematic front sectional view of the major part of an image reading apparatus as the ninth embodiment equipped with charge eliminating devices.
Figure 16:
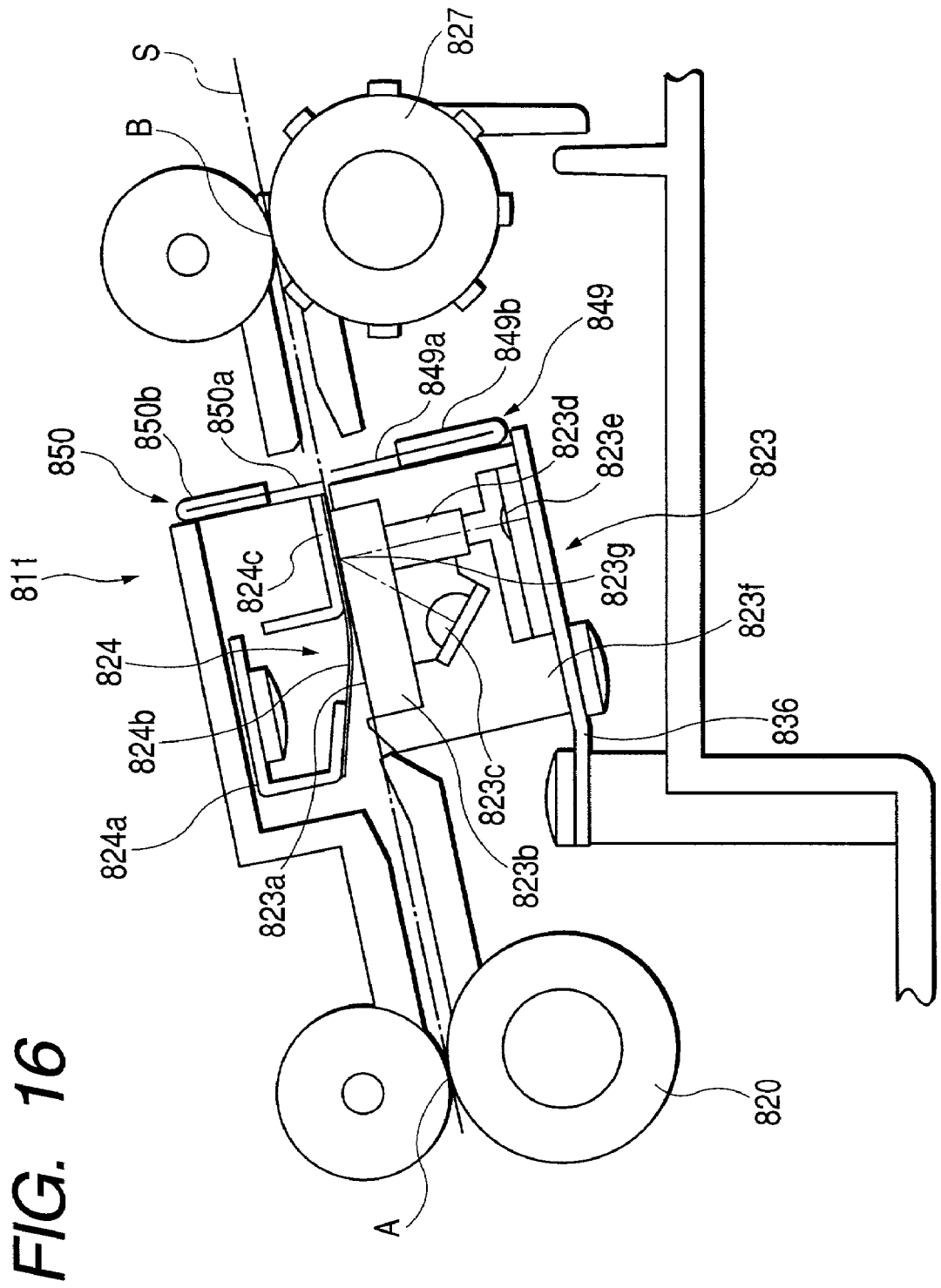
FIG. 16 is a schematic front sectional view of the major part of an image reading apparatus as the tenth embodiment equipped with charge eliminating devices.

The image reading apparatus 411, 511, 611 of the sixth, seventh, and eighth embodiments were constructed to read the two sides of the original by one reading operation, whereas the image reading apparatus 711 of the ninth embodiment shown in FIG. 15 is provided with only the front side reading portion 723 and arranged to read only the front side of the original by one reading operation. In the image reading apparatus 711 of the ninth embodiment, the same portions as those in the image reading apparatus 411 of the sixth embodiment are denoted by the same reference symbols (Like portions have the prefix 700 with the same last two digits.) and the description thereof will be omitted.

In the image reading apparatus 711 of the ninth embodiment, the front-side charge eliminating brush (charge eliminating means) 747 and the back-side charge eliminating brush (charge eliminating means) 748 are provided upstream of the front side reading portion 723.

The front-side charge eliminating brush 747 is comprised of a brush portion 747*a* and a metal plate 747*b*. The metal plate 747*b* is fixed to the front side reading portion 723. The distal end of the brush portion 747*a* is located a little below the plane of the image reading surface 723*a* so as to eliminate the charge accumulated on the front side of the original S at the position near the original. The metal plate 747*b* is connected to the ground of the housing through an unrepresented earth. Accordingly, the front-side charge eliminating brush 747 is arranged to discharge the charge eliminated by the brush portion 747*a*, via the metal plate 747*b* to the ground, thereby preventing the original from adhering to the contact glass plate 723*b*.

The back-side charge eliminating brush 748 is comprised of a brush portion 748*a* and a metal plate 748*b*. The metal plate 748*b* is fixed to the front side white reference portion 724. The distal end of the brush portion 748*a* is located a little above the plane of the image reading surface 723*a* so as to eliminate the charge accumulated on the back side of the original S at the position near the original. The metal plate 748*b* is connected to the ground of the housing through an unrepresented earth. Accordingly, the back-side charge eliminating brush 748 is arranged to discharge the charge eliminated by the brush portion 748*a*, via the metal plate 748*b* to the ground.

Since the back-side charge eliminating brush 748 is arranged to eliminate the charge mainly from the back side of the original in this way, the original is smoothly transported even after entry into the front side reading point 723*g*, without adhering to the front side white reference portion 724.

Accordingly, the image reading apparatus 711 of the ninth embodiment is also able to enhance the transportation performance, the stacking performance, and the charge eliminating effect as the image reading apparatus 411, 511, 611 of the sixth, seventh, and eighth embodiments were.

The image reading apparatus 711 of the present embodiment may also be modified so as to read only the back side of the original by the back side reading portion 425, 525, 625, by excluding the front side reading portion 423, 523, 623 from the image reading apparatus 411, 511, 611 of the sixth, seventh, and eighth embodiments. In this case, the apparatus is also able to enhance the transportation performance, the stacking performance, and the charge eliminating effect as the image reading apparatus 411, 511, 611 of the sixth, seventh, and eighth embodiments were.

Further, the image reading apparatus 711 of the present embodiment was provided with the front-side charge eliminating brush 747 and the back-side charge eliminating brush 748, but the apparatus may also be constructed with only either one charge eliminating brush. In this case, the apparatus is also able to enhance the transportation performance, the stacking performance, and the charge eliminating effect.

(Image Reading Apparatus of the Tenth Embodiment)

The image reading apparatus 811 of the tenth embodiment is also provided with only the front side reading portion 823 and arranged to read only the front side of the original by one reading operation as the image reading apparatus 711 of the ninth embodiment was. In the image reading apparatus 811 of the tenth embodiment, the same portions as those in the image reading apparatus 411 of the sixth embodiment are denoted by the same reference symbols (Like portions have the prefix 800 with the same last two digits) and the description thereof will be omitted. This image reading apparatus 811 of the tenth embodiment has the front-side charge eliminating brush (charge eliminating means) 849 and the back-side charge eliminating brush (charge eliminating means) 850 downstream of the front side reading portion 823.

The front-side charge eliminating brush 849 is comprised of a brush portion 849*a* and a metal plate 849*b*. The metal plate 849*b* is fixed to the front side reading portion 823. The distal end of the brush portion 849*a* is located a little below the plane of the image reading surface 823*a* so as to eliminate the charge accumulated on the front side of the original S at the position near the original. The metal plate 849*b* is connected to the ground of the housing through an unrepresented earth. Accordingly, the front-side charge eliminating brush 849 is arranged to discharge the charge eliminated by the brush portion 849*a*, via the metal plate 849*b* to the ground.

When the front-side charge eliminating brush 845 is arranged to eliminate the charge mainly from the front side of the original in this way, even while and after the original is delivered out of the apparatus and onto the original delivery tray 129 (FIG. 11) by the delivery roller 827, the charge is mainly eliminated from the front side of the original to be opposed to the original delivery tray 129, and thus the original is smoothly transported and stacked thereonto without adhering to the original delivery tray 129 or to the original having already been delivered and stacked on the original delivery tray 129.

The back-side charge eliminating brush 850 is comprised of a brush portion 850*a* and a metal plate 850*b*. The metal plate 850*b* is fixed to the front side white reference portion 824. The distal end of the brush portion 850*a* is located a little above the plane of the image reading surface 823*a* so as to eliminate the charge accumulated on the back side of the original S at the position near the original. The metal plate 850*b* is connected to the ground of the housing through an unrepresented earth. Accordingly, the back-side charge eliminating brush 850 is arranged to discharge the charge eliminated by the brush portion 850*a*, via the metal plate 850*b* to the ground.

When the back-side charge eliminating brush 850 is arranged to eliminate the charge mainly from the back side of the original in this way, even in the case where the succeeding original is delivered onto the preceding original that has already been delivered out of the apparatus onto the original delivery tray 129 by the delivery roller 827, the charge is mainly eliminated from the back side of the preceding original to be opposed to the succeeding original and thus the succeeding original is smoothly transported and stacked thereonto without adhering to the stacked original.

Accordingly, the image reading apparatus 811 of the tenth embodiment is also able to enhance the transportation performance, the stacking performance, and the charge eliminating effect as the image reading apparatus 411, 511, 611, 711 of the sixth to the ninth embodiments were.

The image reading apparatus 811 of the present embodiment may also be modified to read only the back side of the original by the back side reading portion 425, 525, 625, by excluding the front side reading portion 423, 523, 623 from the image reading apparatus 411, 511, 611 of the sixth, seventh, and eighth embodiments. In this case, the apparatus is also able to enhance the transportation performance, the stacking performance, and the charge eliminating effect as the image reading apparatus 411, 511, 611 of the sixth, seventh, and eighth embodiments were.

Further, the image reading apparatus 811 of the present embodiment is provided with the front-side charge eliminating brush 849 and the back-side charge eliminating brush 850, but the apparatus may also be constructed with only either one charge eliminating brush. In this case, the apparatus is also able to enhance the transportation performance, the stacking performance, and the charge eliminating effect.

The image reading apparatus of the above embodiments were arranged to read the original by the contact image sensors, but charge coupled devices (CCDs) may also be used as the photoelectric conversion elements to read the images on the original surfaces by reduction optical systems for focusing the images at a reduction ratio through lenses.

However, the contact image sensors have shallower depths of field than the reduction optical systems and it is thus necessary to keep the original in contact with the contact image sensors upon reading of the original. Therefore, the original is strongly urged against the glass surfaces of the contact image sensors by the pressing members than in the case of the reduction optical systems. Since the original is thus charged more easily by the pressing member portions, the charge eliminating means of the present invention are more effective in the apparatus using the contact image sensors.

The image reading apparatus of the present invention is able to reduce the static electricity on the original so as to enhance the transportation performance of the original and stability of transportation. It is also feasible to prevent malfunctions and breakage of the image reading means.

The image reading apparatus of the present invention is able to enhance the stability of stacking performance of the original onto the sheet stack tray, for example, onto the original delivery tray.

What is claimed is:

1. An image reading apparatus comprising:
   first reading means and second reading means disposed along a transportation path for transporting an original and arranged to read images on the original from two sides of the original,
   wherein said first reading means is fixedly supported while said second reading means is rotatably supported;
   first abutting means and second abutting means provided in said first reading means and said second reading means, respectively, and arranged to come into contact with each other outside an original transportation region;
   reading urging means for urging said second reading means in a direction in which said second abutting means abuts against said first abutting means;
   a first white reference disposed in a position opposite to said first reading means so that the original is urged toward an image reading surface of said first reading means, said first white reference having white color as a color reference of said first reading means; and
   a second white reference disposed in a position opposite to said second reading means so that the original is urged toward an image reading surface of said second reading means, said second white reference having white color as a color reference of said second reading means.

2. An image reading apparatus according to claim 1, wherein in an abutting state of said first abutting means and said second abutting means, the image reading surface of said first reading means and the image reading surface of said second reading means are substantially coplanar with each other.

3. An image reading apparatus according to claim 2, wherein a force for urging said second white reference toward said second reading means is smaller than a force exerted by said reading urging means to urge said second reading means.

4. An image reading apparatus according to claim 3, wherein one of the image reading surface of said first reading means and the image reading surface of said second reading means functions as one of said first and second abutting means.

* * * * *